United States Patent [19]

Sato

[11] Patent Number: 4,903,312

[45] Date of Patent: Feb. 20, 1990

[54] CHARACTER RECOGNITION WITH VARIABLE SUBDIVISIONS OF A CHARACTER REGION

[75] Inventor: Gen Sato, Yokohama, Japan

[73] Assignee: Ricoh Company, Ltd., Japan

[21] Appl. No.: 241,825

[22] Filed: Sep. 6, 1988

Related U.S. Application Data

[63] Continuation of Ser. No. 51,611, May 15, 1987, abandoned.

[30] Foreign Application Priority Data

May 19, 1986 [JP] Japan .................................. 61-114042
Oct. 20, 1986 [JP] Japan .................................. 61-249159
Oct. 22, 1986 [JP] Japan .................................. 61-251537

[51] Int. Cl.[4] .............................................. G06K 9/48
[52] U.S. Cl. ......................................... 382/21; 382/9; 382/18
[58] Field of Search ....................... 382/21, 22, 16, 19, 382/18, 9, 55, 51, 25

[56] References Cited

U.S. PATENT DOCUMENTS

| | | | |
|---|---|---|---|
| 4,162,482 | 7/1979 | Su ........................................... | 382/55 |
| 4,163,214 | 7/1979 | Komori et al. ........................ | 382/18 |
| 4,229,768 | 10/1980 | Kurahayashi et al. ................ | 382/55 |
| 4,254,400 | 3/1981 | Yoda et al. ............................. | 382/18 |
| 4,295,120 | 10/1981 | Yoshida et al. ........................ | 382/18 |
| 4,300,122 | 11/1981 | McMahon .............................. | 382/22 |
| 4,688,088 | 8/1987 | Hamazaki et al. ..................... | 382/18 |

Primary Examiner—Leo H. Boudreau
Assistant Examiner—Joseph Mancuso
Attorney, Agent, or Firm—Mason, Fenwick & Lawrence

[57] ABSTRACT

An input, unknown character is optionally read to form a binary character image, and a plurality of directionality codes are assigned to pixels defining the contour of the character image selectively to define a code-assigned character image, which is then subdivided into a plurality of sub-regions in the form of mesh such that each sub-region includes a substantially equal number of assigned codes. Then, a histogram of the codes is defined for each of the sub-regions to form a collection of histograms for the input character. The input character is compared with each of registered, known characters, each having a collection of similar histograms, and the one having a greatest similarity is selected to identify the input character. The similarity is determined by calculating a distance between the histograms of the input character and the histograms of the each of the registered characters. Preferably, the binary character image is subjected to line-broadening processing prior to the step of assigning the codes.

51 Claims, 36 Drawing Sheets

CHARACTER
CODE OUTPUT

| PATTERN | | | | | | | | |
|---|---|---|---|---|---|---|---|---|
| CODE | 0 | 1 | 2 | 5 | 3 | 0 | 6 | 0 |

| PATTERN | | | | | | | | |
|---|---|---|---|---|---|---|---|---|
| CODE | 4 | 8 | 0 | 0 | 7 | 0 | 0 | 0 |

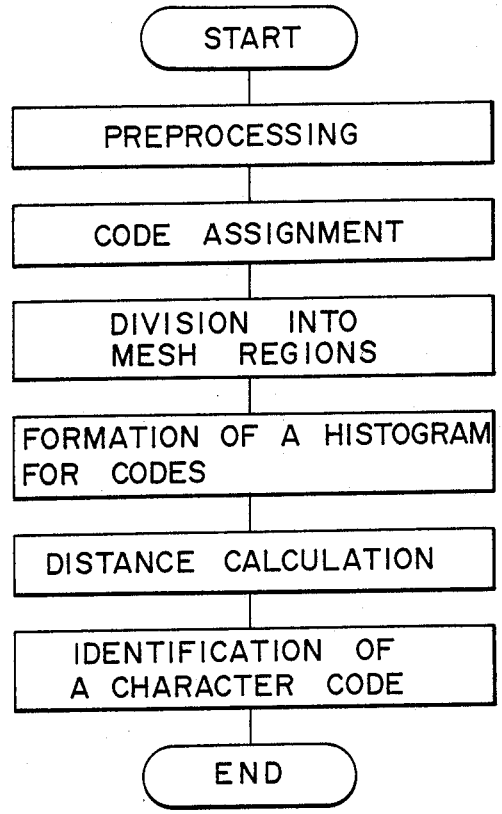
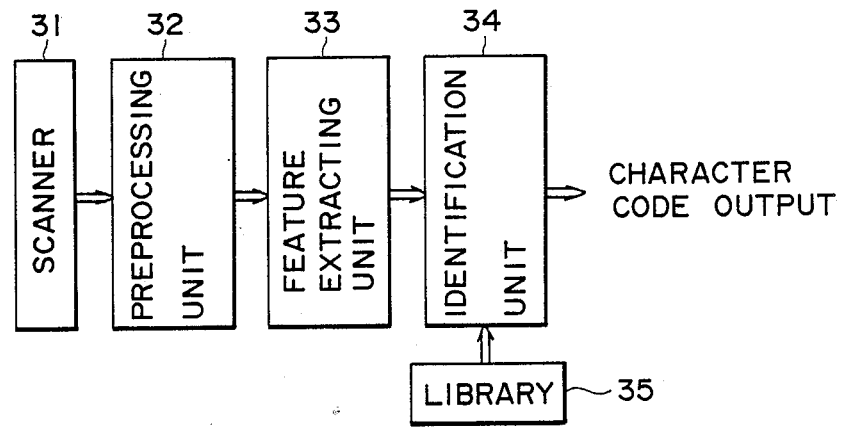

Fig. 10

| PATTERN | | | | | | | |
|---|---|---|---|---|---|---|---|
| CODE | 0 | 1 | 2 | 5 | 3 | 0 | 6 | 0 |

| PATTERN | | | | | | | |
|---|---|---|---|---|---|---|---|
| CODE | 4 | 8 | 0 | 0 | 7 | 0 | 0 | 0 |

| Y | HYi |
|---|-----|
| 1 | 6 |
| 2 | 4 |
| 3 | 4 |
| 4 | 2 |
| 5 | 2 |
| 6 | 7 |
| ┆ | ┆ |

42

| X | 1 | 2 | 3 | 4 | 5 | 6 | ----- |
|-----|----|---|---|---|---|---|-------|
| HXi | 10 | 4 | 3 | 2 | 2 | 2 | ----- |

| Y | HYi |
|---|-----|
| 1 | 6 |
| 2 | 4 |
| 3 | 4 |
| 4 | 2 |
| 5 | 2 |
| 6 | 7 |
| ⋮ | ⋮ |

144

142

| X | 1 | 2 | 3 | 4 | 5 | 6 | ----- |
|---|---|---|---|---|---|---|-------|
| HXi | 10 | 4 | 3 | 2 | 2 | 2 | ----- |

CHARACTER RECOGNITION WITH VARIABLE SUBDIVISIONS OF A CHARACTER REGION

This application is a continuation, of application Serial No, 051,611, filed May 15, 1987, now abandoned.

BACKGROUND OF THE INVENTION

1. Field of the Invention

This invention generally relates to character recognition technology, and, in particular, to a method for recognizing a character by variably subdividing a character region in which a character to be recognized is located. The present invention also relates to a method of subdividing a character region for use in character recognition.

2. Description of the Prior Art

In character recognition of a written, typed or printed character by device, a character to be recognized is first optically read by a scanner to define a binary image of the character, and, then, a character region containing therein the thus defined binary image is divided into a plurality of sub-regions, which is followed by the step of extracting features for each of the sub-regions. In the prior art character recognition technology, the division of region was carried out using fixed subdividing points, as described in the Japanese Patent Laid-Open Pub. No. 56-110191, or by variably determining subdividing points utilizing a center of gravity of the contour distribution of a character to be recognized, as described in "OKI ELECTRIC RESEARCH AND DEVELOPMENT", Dec. 1983, 121, Vol. 50, No. 3, pp. 77–82. However, in the former method, the fixed subdividing points were often found to be inappropriate due to deformations present in a character to be recognized, so that features of the character could not be extracted properly, thereby degrading the character recognition capability. Thus, the fixed subdividing point method has a problem of incapability to cope with character deformations. On the other hand, the latter method using a center of gravity is less susceptible to character deformations; however, the amount of calculations required for subdivisions of a character region is enormous since it utilizes a center of gravity of the contour distribution, so that this method tends to be slow.

In order to cope with the above-mentioned problems, there has been proposed an improved character recognition method as disclosed in the Japanese Patent Application No. 59-217760, which was assigned to the assignee of the present assignee and which was described in U.S.S.N. 915,285, filed Oct. 3, 1986, which, in turn, was also assigned to the assignee of this application and is incorporated herein by reference. The improved character recognition method described in the above-identified U.S.S.N. 915,285 has obviated most of the above-described disadvantages of the prior art. However, there still remains area of further improvements particularly for discrimination between similar characters and for recognition of deformed or low quality characters, printed or handwritten.

SUMMARY OF THE INVENTION

In accordance with one aspect of the present invention, a character to be recognized by device is first optically read to form a binary character image which is then subjected to a line broadening step to broaden the lines constituting the character image. Then, a plurality of directionality codes are selectively assigned to the contour of the character image, and the character image having assigned directionality codes is scanned to calculate the directionality codes. Then, based on the calculated results, subdividing positions are determined and the character image is subdivided using these subdividing positions. Then, a feature, such as a histogram for each of the directionality codes, is extracted from each of the subdivided regions. Then, the extracted features are compared with the features stored for known characters in a library to automatically determine the identify of the character to be recognized.

In accordance with another aspect of the present invention, there is provided a character recognition method according to which a plurality of directionality codes are selectively assigned to the contour of a binary character image corresponding to a character to be recognized, and then the total number of assigned directionality codes and projected histograms onto X and Y axes are obtained. And, then, based on the thus obtained total number and the projected histograms, the binary character image is subdivided into a plurality of mesh regions in X and Y directions, each mesh region containing the assigned directionality codes substantially equally. Then, another histogram with respect to the directionality codes is obtained for each of the mesh regions. Then, the thus obtained histrogram is compared with those stored in a library for known characters to determine the identity of the character to be obtained.

In accordance with a further aspect of the present invention, there is provided a method of optimizing the subdividing positions of a character image. That is, in character recognition, a character to be recognized is first optically read by an image scanner, thereby converting the character into a binary character image, which is then subdivided into a plurality of mesh regions or sub-regions so as to extract features from each of the sub-regions. Successful extraction of such features depends on proper determination of subdividing positions. In accordance with this aspect of the present invention, there is provided a method of subdiving a character region, wherein a predetermined feature is assigned to a binary character image and the total number of pixels having the assigned feature and projected histograms onto X and Y axes are obtained, based on which the binary character image is subdivided into a plurality of mesh regions in X and Y directions, each mesh region containing the pixels having the assigned feature substantially equally.

It is therefore a primary object of the present invention to obviate the disadvantages of the prior art as described above and to provide an improved character recognition method.

Another object of the present invention is to provide an improved character recognition method fast in operation, high in accuracy and recognition rate and simple in structure.

A further object of the present invention is to provide an improved character recognition method capable of automatically recognizing characters even if deformed or poorly written or printed.

A still further object of the present invention is to provide an improved method of subdividing region having therein a character into a plurality of sub-regions optimally.

Other objects, advantages and novel features of the present invention will become apparent from the following detailed description of the invention when considered in conjunction with the accompanying drawings.

BRIEF DESCRIPTION OF THE DRAWINGS

FIG. 3 is an illustration showing one example of a binary character image in the form of a dot matrix obtained by optically scanning the character "B";

FIG. 4 is an illustration showing the result when a step of line broadening has been applied to the binary character image shown in FIG. 3;

FIG. 6 is a schematic illustration showing the correspondence between a plurality of directionality codes to be selectively assigned to the white contour pixels of a binary character image and pixel patterns;

FIG. 8 is flow chart showing the sequence of steps of a character recognition process in accordance with another embodiment of the present invention;

FIG. 9 is a block diagram showing the structure of an optical character recognition system for implementing the process shown in FIG. 8;

FIG. 10 is a schematic illustration showing the correspondence between a plurality of directionality codes to be selectively assigned to the black contour pixels of a binary character image and pixel patterns;

FIG. 12 is an illustration showing the result when a set of directionality codes for black contour pixels has been selectively assigned to the contour black pixels of the binary character image shown in FIG. 11;

FIG. 13 is an illustration showing the result when a set of directionality codes for white contour pixels has been selectively assigned to the contour white pixels of the binary character image shown in FIG. 11;

FIG. 14 is an illustration showing an example of X and Y histograms for a binary character image to the contour of which a set of directionality codes has been selectively assigned;

FIG. 18 is an illustration showing the result of character subdivision implemented by the process shown in FIG. 17;

FIG. 20 is an illustration showing the result of character subdivision implemented by the process shown in FIG. 19;

FIG. 23 is an illustration showing an example of a histogram for the feature pixels of a binary character image;

FIGS. 24a and 24b are illustrations showing the results of character subdivision when implemented by the process shown in FIGS. 21a and 21b;

FIGS. 26a and 26b are illustrations showing the results of character subdivision when implemented by the processes shown in FIGS. 21a and 21b and 25a and 25b, respectively;

FIGS. 28a and 28b are illustrations showing the results of character subdivision when implemented by the processes shown in FIGS. 25a and 25b and 27a and 27b, respectively;

Figure 30B:
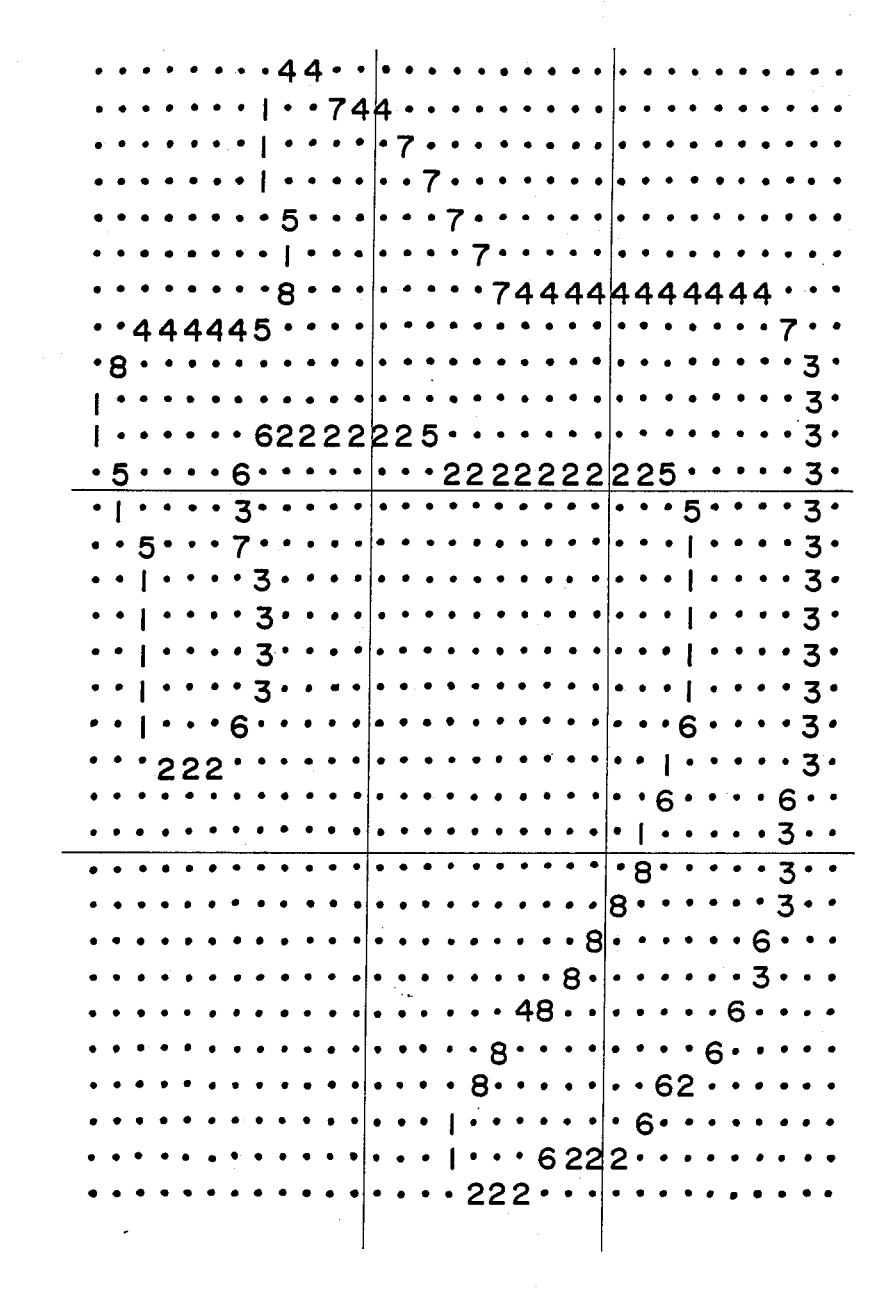

FIGS. 30a and 30b are illustrations showing the results of subdivision of a Japanese katakana character "wu" when implemented using fixed positions of subdivision.

DESCRIPTION OF THE PREFERRED EMBODIMENTS

Figure 1:
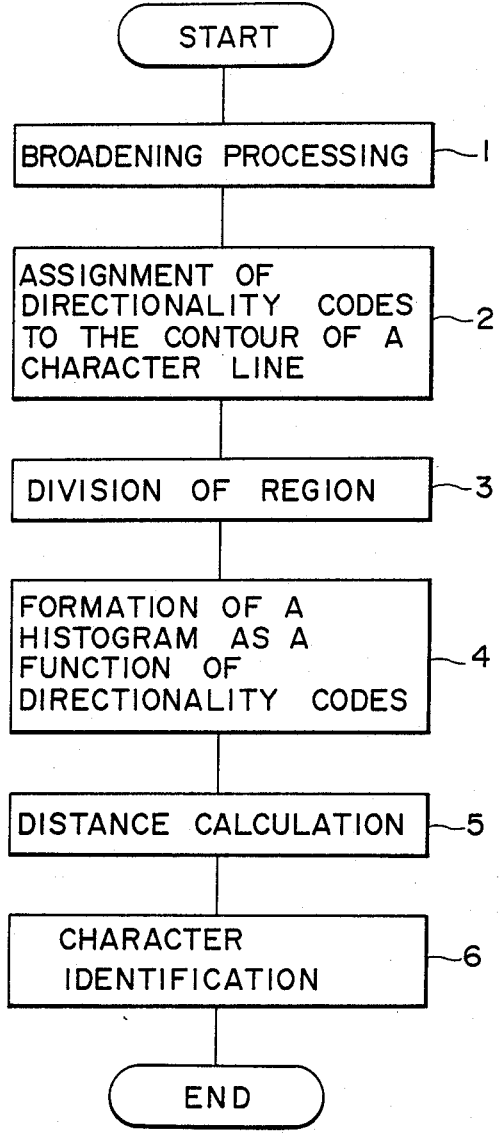
FIG. 1 is a flow chart showing the sequence of steps for automatic recognition of an input character in accordance with one embodiment of the present invention.
Figure 2:
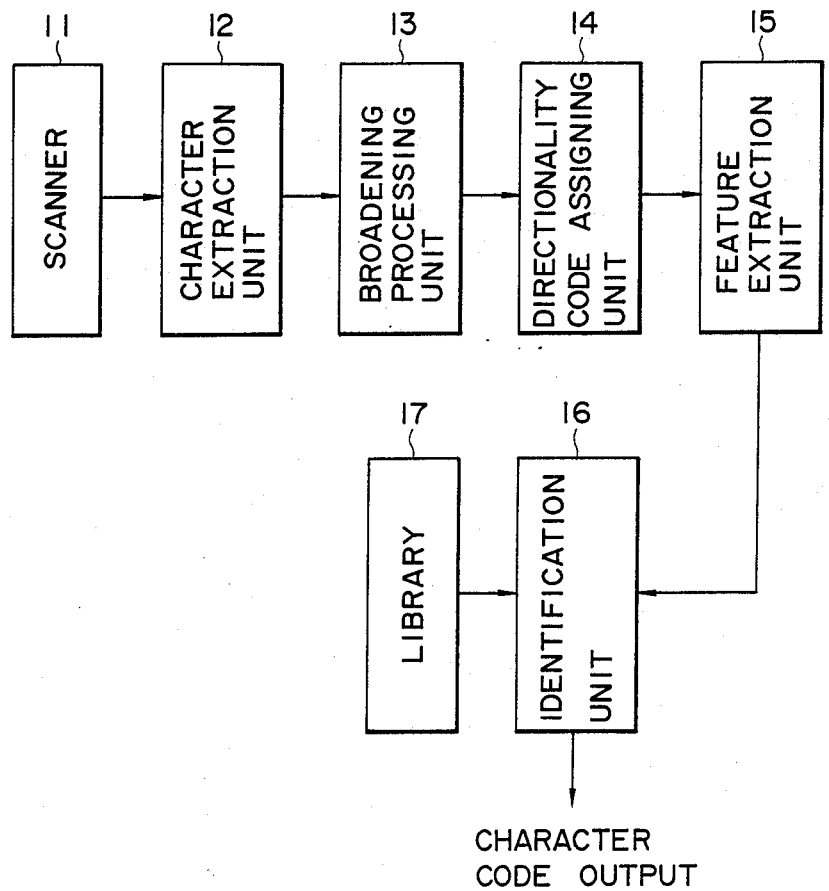
FIG. 2 is a block diagram schematically showing the overall structure of an optical character recognition system for the steps shown in FIG. 1.

Referring now to FIG. 1, there is shown in flow chart a character recognition process constructed in accordance with one embodiment of the present invention. FIG. 2, on the other hand, illustrates in block form an optical character reader (OCR) or optical character recognition system for implementing the character recognition process shown in FIG. 2. In the first place, a written or printed input character to be recognized, i.e., unknown character, is optically read by an image scanner 11, so that the unknown character is converted into a binary character image in which a character portion is represented by one of the two binary data, e.g., "1s", and the remaining background portion is represented by the other of the two binary data. It is to be noted that an original document typically contains a number of characters, which are all scanned by the scanner 11 line by line. Thus, there is usually obtained a series of binary character images which is then supplied to a character extraction unit 12 where the series of binary character images are separated individually.

An individually separated binary character image is then supplied to a broadening processing unit 13 where a line broadening process is applied to the individual binary character image (step 1 in FIG. 1). The line broadening process, in one form, is a process in which the two white pixels on both left and right sides of a black pixel in the binary character image are changed to black pixels, thereby broadening the line forming the binary character image.

Figure 3:
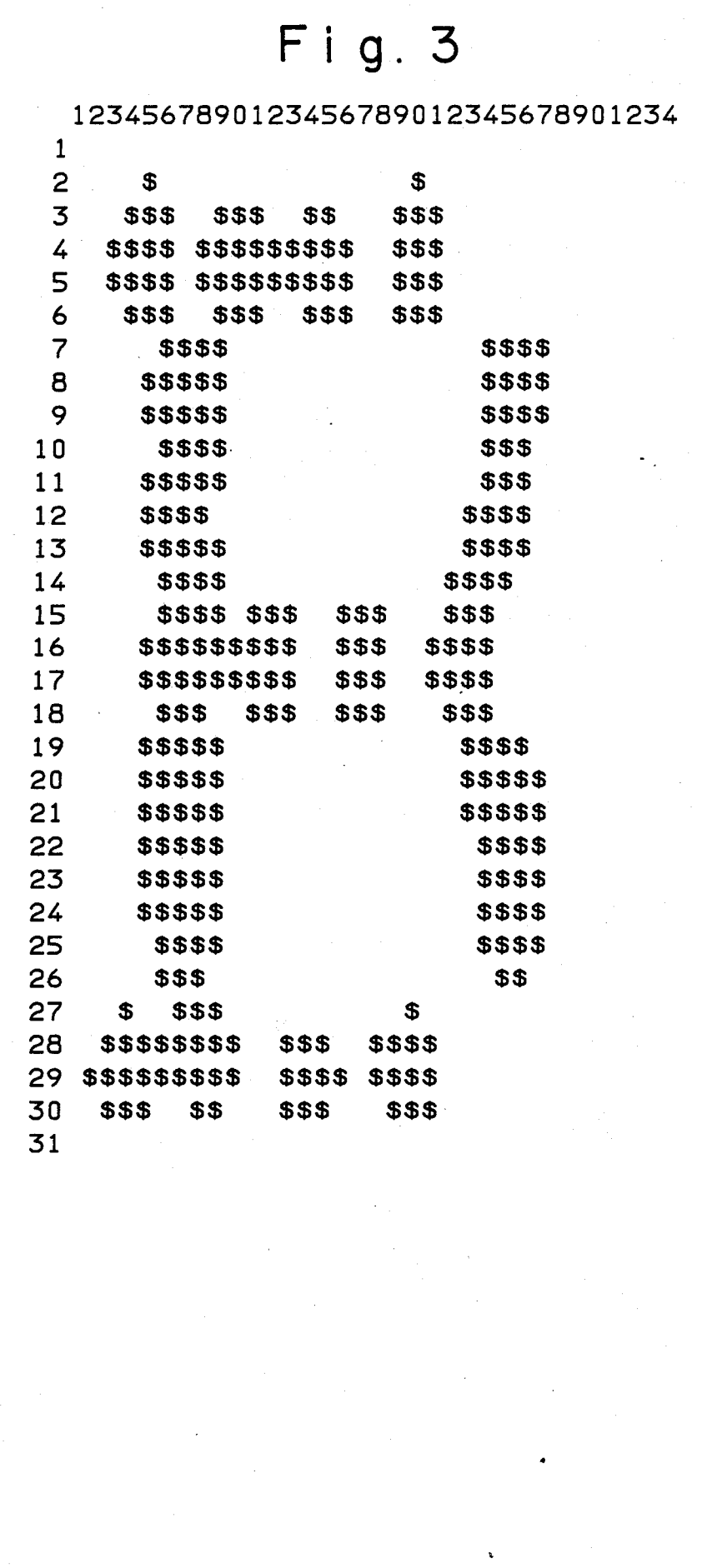
Figure 4:
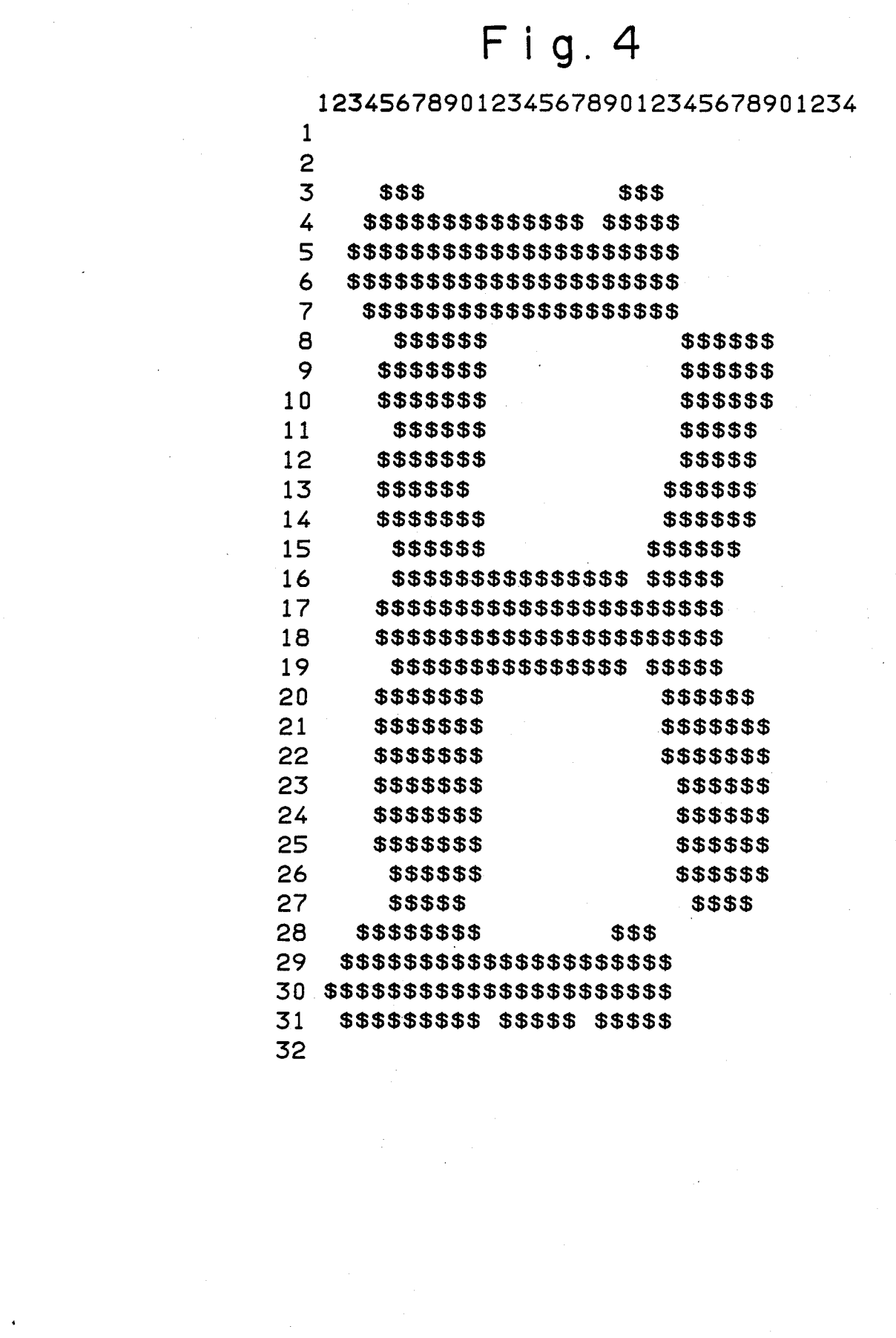

FIG. 3 shows a binary character image for an English capital letter "B" in the form of 5×7 dot matrix when optically read at the resolution of 12 lines/mm. It is to be noted that, in FIG. 3, symbol "$" corresponds to a black pixel. When the above-described line broadening process is applied to this binary character image, there is obtained a line-broadened binary character image shown in FIG. 4. As may be seen easily, the gaps between dots become plugged with dots, so that the line-broadened binary character image is less affected by shift in dot position and scatter in dot-to-dot spacing. Thus, the later steps of character subdivision and feature extraction can be carried out more stably with such a line-broadened binary character image. If the resolution of the scanner 11 is higher, e.g., 16 lines/mm, since the dot-to-dot spacing of a binary character image increases, the effect of the above-described line broadening scheme may not be enough. In this case, the line broadening scheme can be implemented such that not only the left and right white pixels of a black pixel, but also the top and bottom white pixels of the black pixel are changed to black pixels. Thus, in this case, four adjacent white pixels, i.e., left and right and top and bottom pixels, are all changed to black pixels instead of two pixels in the previous example.

Then, the line-broadened binary character image is supplied to a directionality code assigning unit 14 where a plurality of predetermined directionality codes shown in FIG. 6 are selectively assigned to the white pixels adjacent to the contour of the binary character image (step 2). As shown in FIG. 6, there are nine different directionality codes "0" through "8" each of which is associated with a unique pattern of pixel arrangement. The corresponding pixel arrangement pattern consists of five pixels which include a center pixel as a pixel of interest, a pair of left and right pixels which are located on the left-hand and right-hand sides of the center pixel and a pair of top and bottom pixels which are located on the top and bottom of the center pixel. Each pixel is thus represented by a small square. A shaded square represents a black pixel and an unshaded square represents a white pixel. It should also be noted that there are eight possible patterns for directionality code "0"; whereas, each of the other directionality codes "1" through "1" has a unique pixel arrangement pattern.

Figure 5:
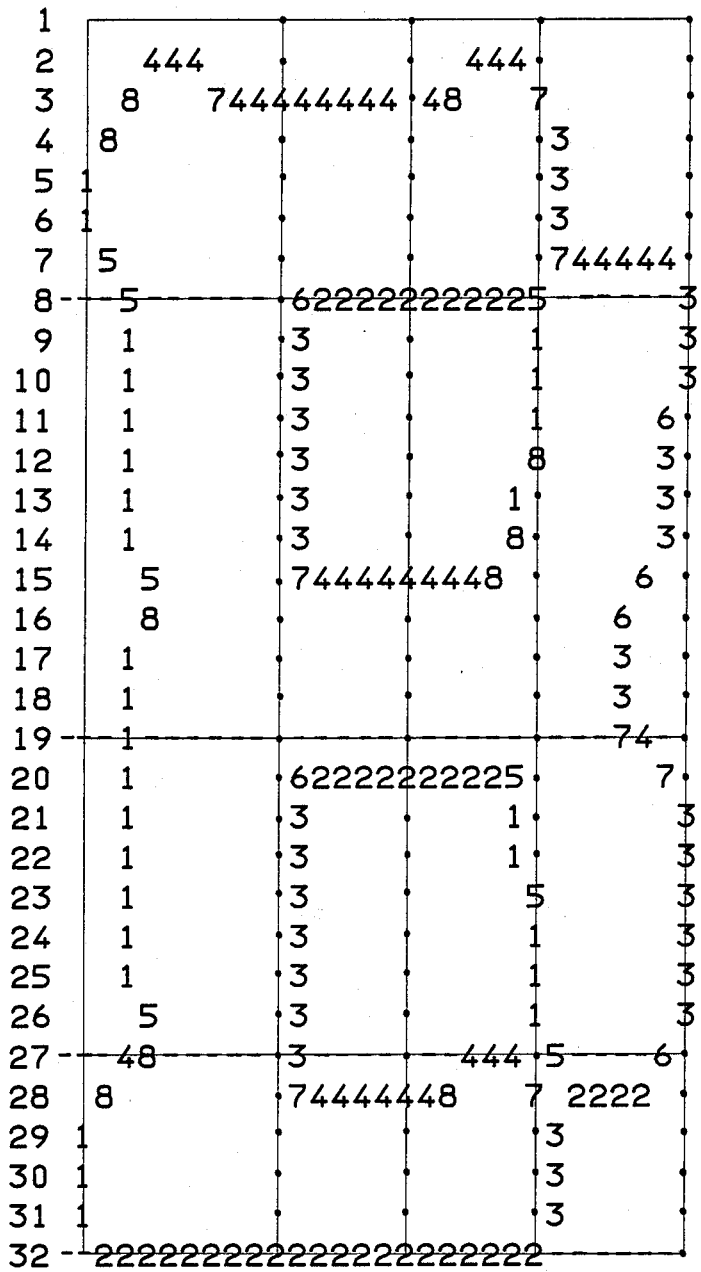
FIG. 5 is an illustration showing the result when a plurality of predetermined directionality codes have been selectively assigned to the contour of the broadened binary character code shown in FIG. 4 and also showing the result of subdivisions of the image.

The assignment of a directionality code to each of the white pixels adjacent to the contour of a binary character image is carried out in the following manner. The line-broadened binary character image is scanned, during which each of the white pixels boardering the contour of the line-broadened binary character image, together with its top and bottom and right and left pixels, is compared with each of the patterns shown in FIG. 6. Thus, when a pixel pattern having the same arrangement of black and white pixels has been found, the corresponding directionality code is assigned to the white pixel in question. Upon completion of assignment of directionality codes to the white pixels adjacent to the contour of the line-broaded binary character image shown in FIG. 5, there is obtained a character whose contour is defined by the directionality codes.

In the above-described example, a set of directionality codes has been selectively assigned to the white codes adjacent to the contour of the line-broadened binary character image. On the other hand, it should be noted that another set of directionality codes as shown in FIG. 10 may also be used, in which case, selective assignment of the directionality codes shown in FIG. 10 is carried out to the black pixels defining the contour of the line-broadened binary character image.

The code-assigned character image is then supplied to a feature extracting unit 15 where the code-assigned character image is scanned to count the directionality codes and subdivision locations are determined based on the counted value, whereby the height and width of the character image is subdivided into four sections, so that there are obtained 4×4 mesh sub-regions (step 3). The method of variable subdivision of a character image or region depending on the counted value of directionality codes will be described more in detail later. Then, the code-assigned character image is again scanned and the individual directionality codes are counted for each of the subdivided regions, or sub-regions, and a histogram with respect to the directionality codes is created for each of the sub-regions (step 4). This histogram information is then supplied to an identification unit 16 as a feature of an input or unknown character to be recognized. The identification unit 16 is also connected to receive information from a library 17 where similar histograms are registered for a number of known characters. Thus, upon receipt of histogram information for an unknown input character, the identification unit 16 compares it with each of the stored histogram data in the library to find one which is most closest to the histogram information of the unknown character, thereby identifying or recognizing the unknown input character as the registered character having the closest histrogram data.

In this identification step, a distance between the histogram data of the unknown character and the histogram data of one of the registered character in the library 17 is calculated (step 5). Such a distance can be a simple euclidean distance. That is, denoting a histogram of a directionality code k for a sub-region (i,j) of an input character by Hkij and a histogram of a directionality code k for a sub-region (i,j) of a known character registered in the library 17 by Dkij, then a distance d between these two histograms can be calculated by the following equation.

$$d = \sum_j \sum_i \sum_k |Dkij - Hkij|$$

Then, the known character which is registered in the library 17 and which has the smallest distance calculated according to the above equation is now selected and supplied as an output (step 6).

Figure 7:
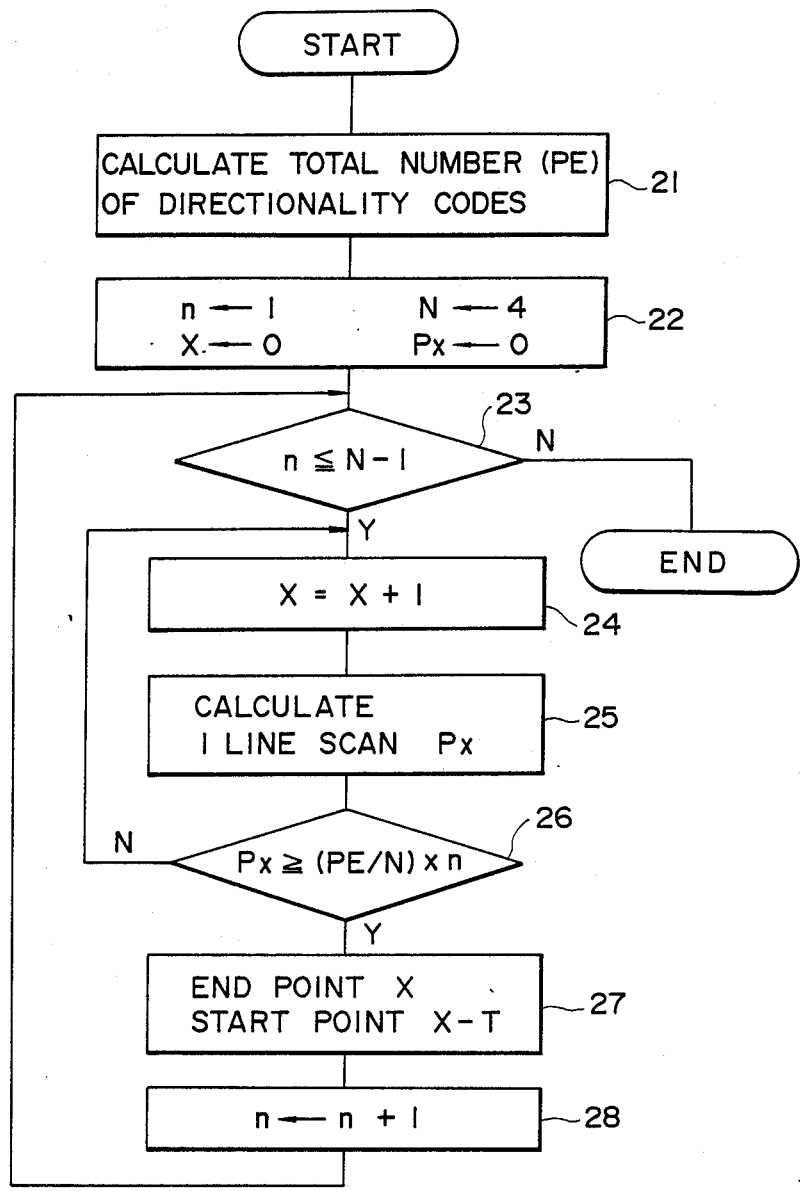
FIG. 7 is a flow chart showing the sequence of steps of a process of character subdivisions which is suitable for application to the character recognition method shown in FIG. 1.

Now, the character subdivision process at step 3 will be described in detail below with particular reference to FIG. 7. It is to be noted that the flow chart shown in FIG. 7 shows a sequence of steps for determining locations of subdivisions along the X axis; however, the locations of subdivisions along the Y axis can also be determined by a similar process. It should also be noted that the character subdivision process which is about to be described is carried out at the feature extraction unit 15. The function of the feature extraction unit 15 is typically provided by a combination of hardware, such as a microprocessor and a memory, and a software program. No doubt, there can be built any such combination for implementing the present character subdivision process by one skilled in the art without any difficulty. It is to be noted that such elements as a counter and a register which will be mentioned in the following description may correspond to an internal register of a microprocessor or a register of a memory and that a determination step can be carried out by a microprocessor.

In the first place, a description will be had with respect to subdivisions in the X direction. The code-assigned character image stored in a memory is scanned and the total number PE of assigned directionality codes, i.e., number of pixels defining the contour of a character line, is counted (step 21 in FIG. 7). Then, the initial value of "1" is set in a counter n with the number of subdivisions in the X direction (4 in the present example) being set in a counter N, the amount of overlapping of sub-regions being set in a register T and a directionality code counter Px and a X address counter being cleared (step 22). Upon completion of this preparatory step, the code-assigned character image is scanned with Y direction as the main scanning direction and X direction as an auxiliary scanning direction which is normal to the Y direction, during which the directionality codes are counted to determine the locations of subdivisions in X direction one after another.

Described more in detail in this respect, the X address counter for designating a scan line is incremented by 1 (step 24), and, then, while the line designated by the count value of the X counter is being scanned in Y direction, the count value of a directionality code counter Px is increased every time when a directionality code has been detected (step 25). Upon completion of scanning of one line, it is determined whether or not the count value of the directionality code counter Px, i.e., the number of directionality codes between the initial line corresponding to X=1 and the current line designated by the X address counter, is equal to or above (PE/N)×n (step 26). If the result is negative, then it goes back to step 24 to scan the next line and again count the directionality codes when found. On the other hand, if the result at step 26 is affirmative, then the line indicated by the current count in the X address counter is determined as an end point or position (i.e., right-hand side location of subdivision) of an nth subdivision in X direction. And, the line indicated by a value obtained by subtracting the value of a register T from the current count value in the X address counter is determined as a start point or position (i.e., left-hand side location of subdivision) of the next sub-region (step 27). Then, the count of counter n is incremented by 1 (step 28), and, then, it goes back to step 23 to repeat a similar process.

In this manner, the line position (X address) where the number Px of directionality codes has reached the value of PE/4 is defined as an end point of the 1st sub-region, and a line prior to that position by T number of lines is defined as a start point of the 2nd sub-region. And, when the number Px of directionality codes has reached the value of PE/2, its line position is defined as an end point of the 2nd sub-region, and the line prior to that line by T number of lines is defined as a start point of the 3rd sub-region. Moreover, when the count Px of directionality codes has reached the value of PEX3/4, its line position is defined as an end point of the 3rd sub-region, and the line position prior to that line by T number of lines is defined as a start point of the 4th sub-region. It is to be noted that the start point of the 1st sub-region corresponds to the left-hand side of a character frame and the end point of the 4th sub-region corresponds to the right-hand side of the character frame. Upon determination of the end point of the 3rd sub-region and the start point of the 4th sub-region, the result of determination at step 23 becomes negative, so that the steps for determining the locations of subdivision in X direction are terminated.

Then, the determination of locations of subdivisions in Y direction are carried out in a similar manner. However, since the total number PE of directionality codes has already been determined, this step is not repeated. In this case, the scanning operation for determination of locations of subdivisions is carried out with X direction as the main scanning direction and Y direction as the auxiliary scanning direction. And, the start point of the 1st sub-region in Y direction corresponds to the top side of the character frame, and the end point of the 4th sub-region in Y direction corresponds to the bottom side of the character frame. In this manner, using the thus determined locations of subdivisions (i.e., end and start points) in X and Y directions, the code-assigned character or a region defined by the frame of the code-assigned character is subdivided into a 4×4 mesh of sub-regions. Such a mesh of 4×4 sub-regions are indicated by thin lines in FIG. 5. It is to be noted that in this case the region overlapping amount T is set to be zero.

As described above, in accordance with the present invention, the location of subdivision is determined one by one depending on the location distribution of directionality codes, so that character subdivision can be carried out at locations appropriate for the degree of deformations of a character, which contributes to enhance the recognition rate. Thus, such a process of variably determining locations of subdividing a character can obviate the problems associated with the prior art method using fixed locations of subdivisions without requiring a complicated calculation. Thus, the above-described character subdividing method of the present invention is fast and simple as compared with the above-noted prior art methods. However, as described previously, if a binary character image of a low quality dot matrix character as shown in FIG. 3 were processed without implementing a line broadening step, a problem could be encountered due to shift in dot position and fluctuation of dot-to-dot spacing. In accordance with the present invention, on the other hand, a line broadening step is applied to a binary character image before the step of assignment of directionality codes. Accordingly, the method of the present invention is not adversely affected by the low quality of a binary character image, such as shift in dot position and fluctuation in dot-to-dot spacing. As a result, in accordance with this aspect of the present invention, even for a relatively low quality dot matrix character, such as a 5×7 dot matrix character, there can be obtained a sufficiently high recognition rate.

It should be noted that the line-broadening processing is relatively simple in operation and it can be carried out in a very short period of time, so that there is no chance of prolonging a character recognition time period appreciably. It is to be noted that the line broadening process can take any other form than those described above. Besides, a method of character subdivision applicable to this aspect of the present invention should not be limited only to that described above, and any other character subdividing methods, such as the one described in the Japanese Patent Application No. 59-21027760, can also be applied.

Now, another aspect of the present invention will be described with reference to FIGS. 8 through 20. FIG. 8 illustrates a flow chart showing a sequence of steps of a character recognition process constructed in accordance with one embodiment of this aspect of the present invention, and FIG. 9 shows in block form the structure of an optical character reader (OCR) or optical character recognition system constructed to implement the character recognition process shown in FIG. 8.

Referring to FIG. 9, characters, such as letters and symbols, written or printed on an original are optically read by a scanner 31 and the optically read character information is then converted to a binary character information by a preprocessing unit 32, which also separates the binary character information into individual character data, normalizes the data and then smoothes the data. Thus, an individual binary character image, which has been normalized and smoothed, is supplied to a feature extracting unit 33 where a plurality of predetermined directionality codes are selectively assigned to the contour of such a binary character image. As described previously, there are two sets of such directionality codes, one set for application to white pixels as shown in FIG. 6 and the other set for application to black pixels as shown in FIG. 10. It is to be noted that in the case where use is made of a set of directinality codes for application to black pixels, if a character line has a line width of 2 or more, then such directinality codes will be assigned one for each of the two pixels in the line width direction. On the other hand, if the line width is 1, since there is only one pixel to define a character line, only one directionality code is assigned, so that the number of assigned directinality codes will be a half as compared with the case whose line width is 2 or more. What this indicates is the fact that the feature data would become unstable if a set of directionality codes for black pixels were applied to a thin line whose line width is 1. On the other hand, no such problem arises if use is made of a set of directionality codes for white pixels in the case of such a thin line. On the other hand, if a line-to-line gap is rather small, such a gap may disappear by application of a set of directionality codes for white pixels. In this case, however, no such problem arises if use is made of a set of directionality codes for black pixels. Accordingly, either set of directionality codes should be selected depending on applications.

Figure 11:
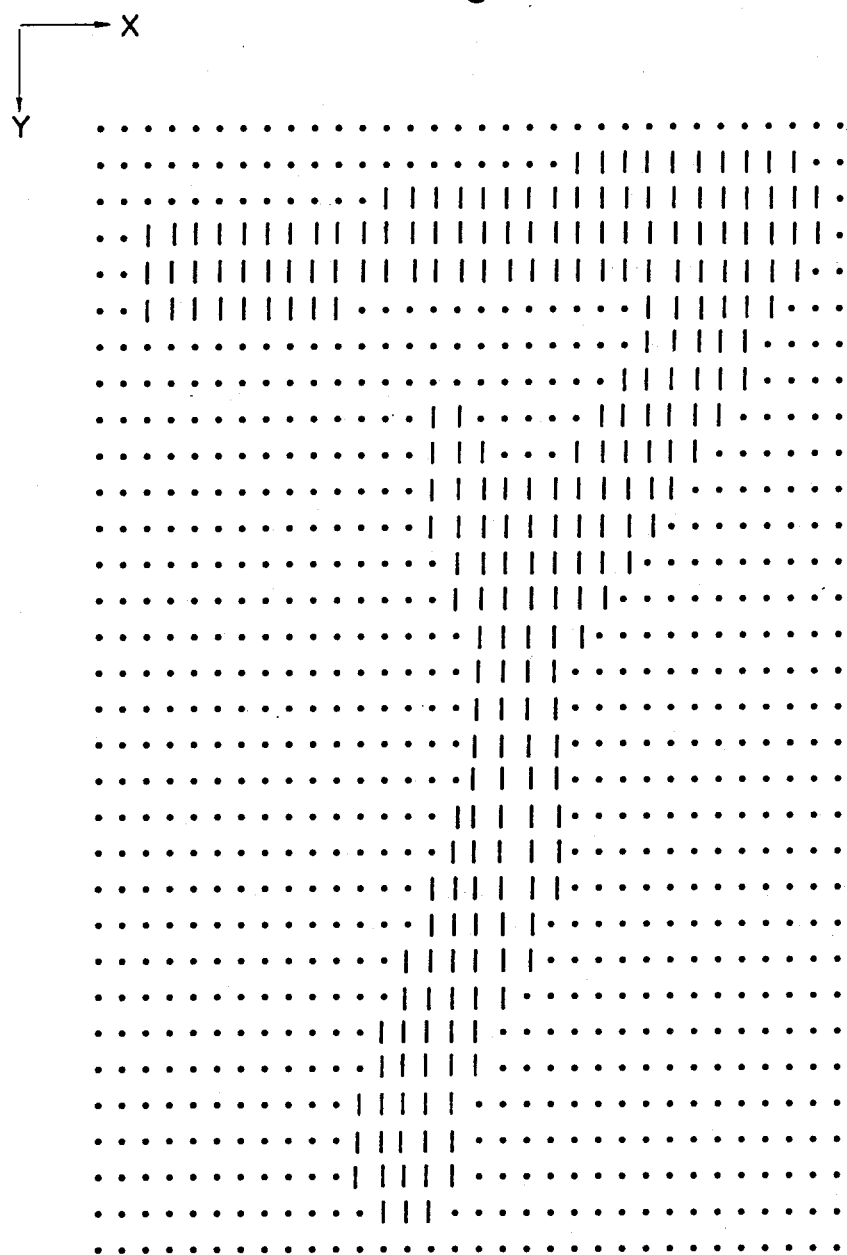
FIG. 11 is an illustration showing a binary character image for a handwritten Japanese katakana letter "a" preprocessing.
Figure 12:
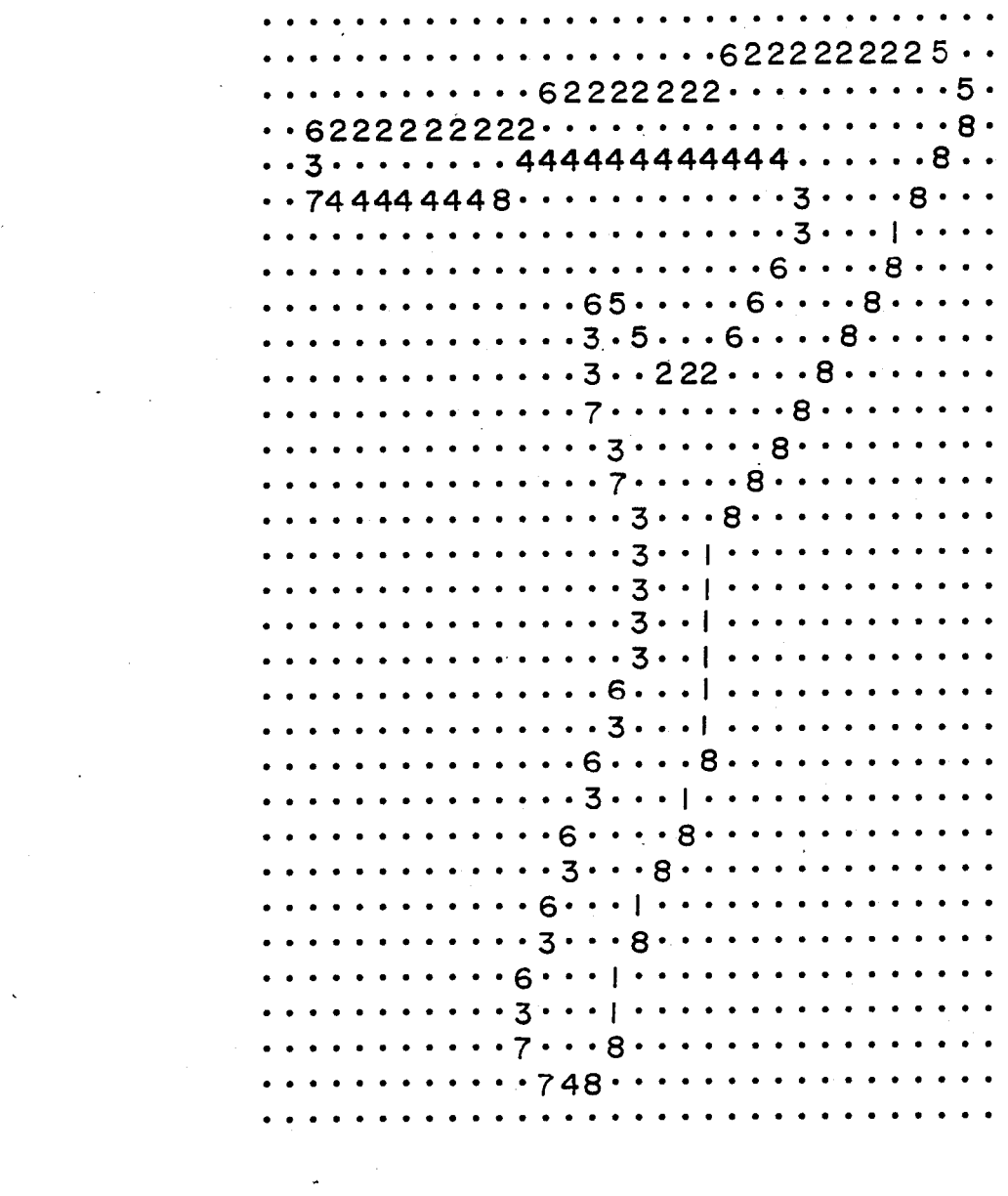
Figure 13:
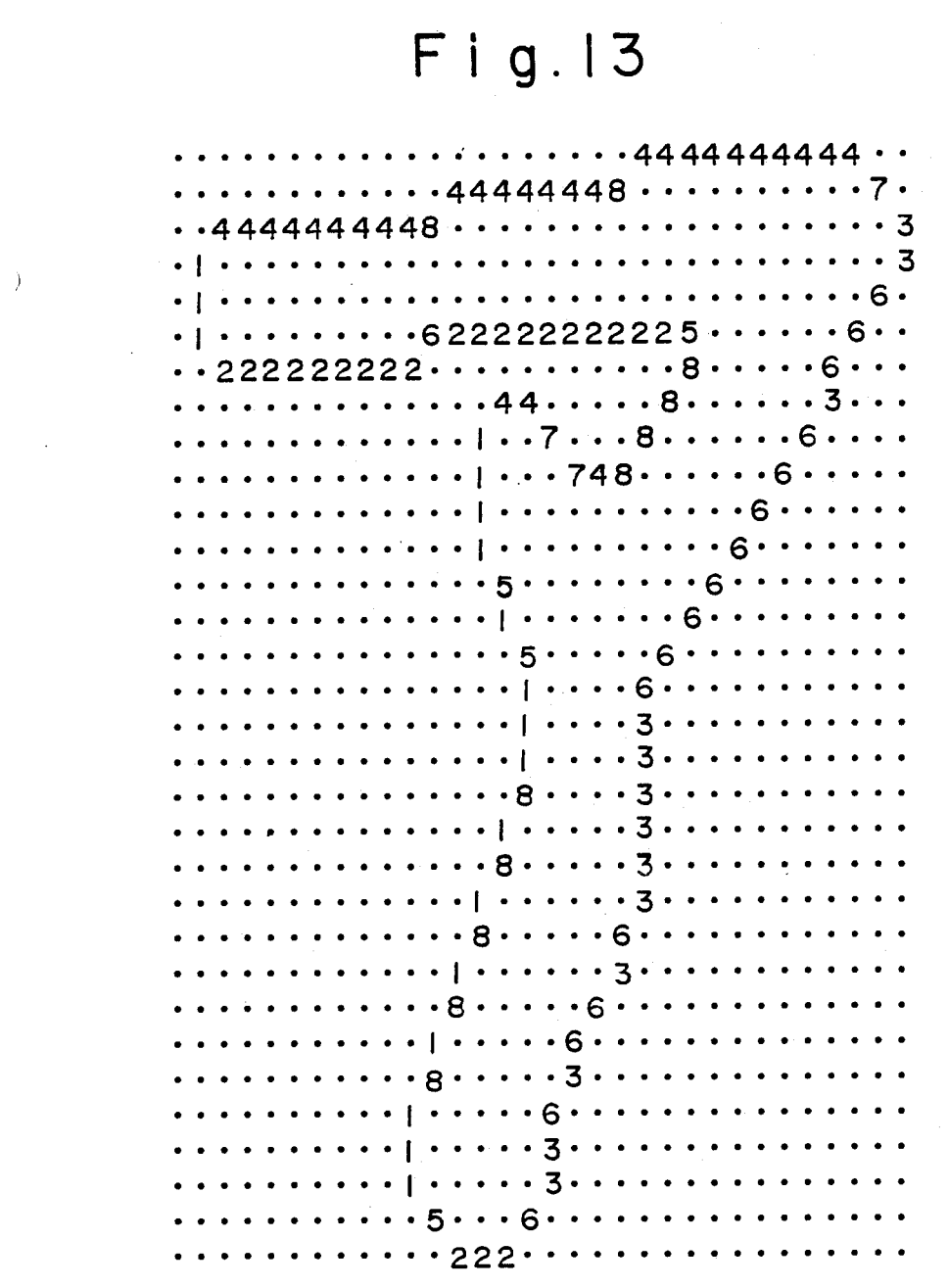

FIG. 11 illustrates a binary character image of a Japanese katakana character "a" corresponding in sound to English vowel "a" supplied from the preprocessing unit 32 to the feature extracting unit 33. When a set of directionality codes for black pixels is assigned to the black pixels defining the contour of the binary character image shown in FIG. 11, there is obtained a code-assigned character image shown in FIG. 12. On the other hand, when a set of directionality codes for white pixels is assigned to the white pixels defining the contour of the binary character image shown in FIG. 11, there is obtained a code-assigned character image shown in FIG. 13.

As will be described later, simultaneously with a directionality code assigning step, the total number of the pixels to which the directionality codes have been assigned and a projected histogram onto an X axis and/or to a Y axis are obtained and stored. It is true that the counting of such total number of pixels and the formation of such a histogram table or tables can be carried out independently subsequent to the directionality code assignment step, but the simultaneous implementation is preferred because there are obtained advantages, such as a reduction of processing time due, for example, to a reduction in the number of scanning operations of a character image.

Thereafter, at the feature extracting unit 33, the code-assigned character image is divided into a plurality of N×M mesh sub-regions in X and Y directions. As will be described further in detail later, the locations of subdivisions along X and Y axes are determined such that each of such N×M mesh sub-regions has substantially uniform number of pixels to which the directionality codes have been assigned. With such a structure, subdivisions of a character image can be carried out as much in conformity as possible to the degree of deformations or deviations from a character image in standard shape. Thus, such a variably determined character subdividing approach is superior to the prior art subdividing method using fixed locations of subdivisions.

Next, at the feature extracting unit 33, for each (i,j) of the divided sub-regions in the form of a mesh, a histogram Hkij as a function of the directionality codes is created. Here, subscript k indicates one of the directionality codes 1 through 8.

At the identification unit 34, using the histogram as a function of the directionality codes extracted by the feature extracting unit 33 from the unknown input character and each of the similar histograms stored in the library for known and registered characters, a distance between the unknown input character and each of the registered characters is calculated. Then, the registered character having the shortest calculated distance is selected and output as a character corresponding to the unknown input character. For this purpose, use may be made of a simple euclidean distance, in which case a distance d1 between a character 1 and a histogram Dkijl of an input character and a histogram Hkij of the input character may be expressed by the following equation.

$$d = \sum_j \sum_i \sum_k |Dkijl - Hkij|$$

Now, specific examples of this aspect of the present invention will be described below.

EXAMPLE 1

Figure 14:
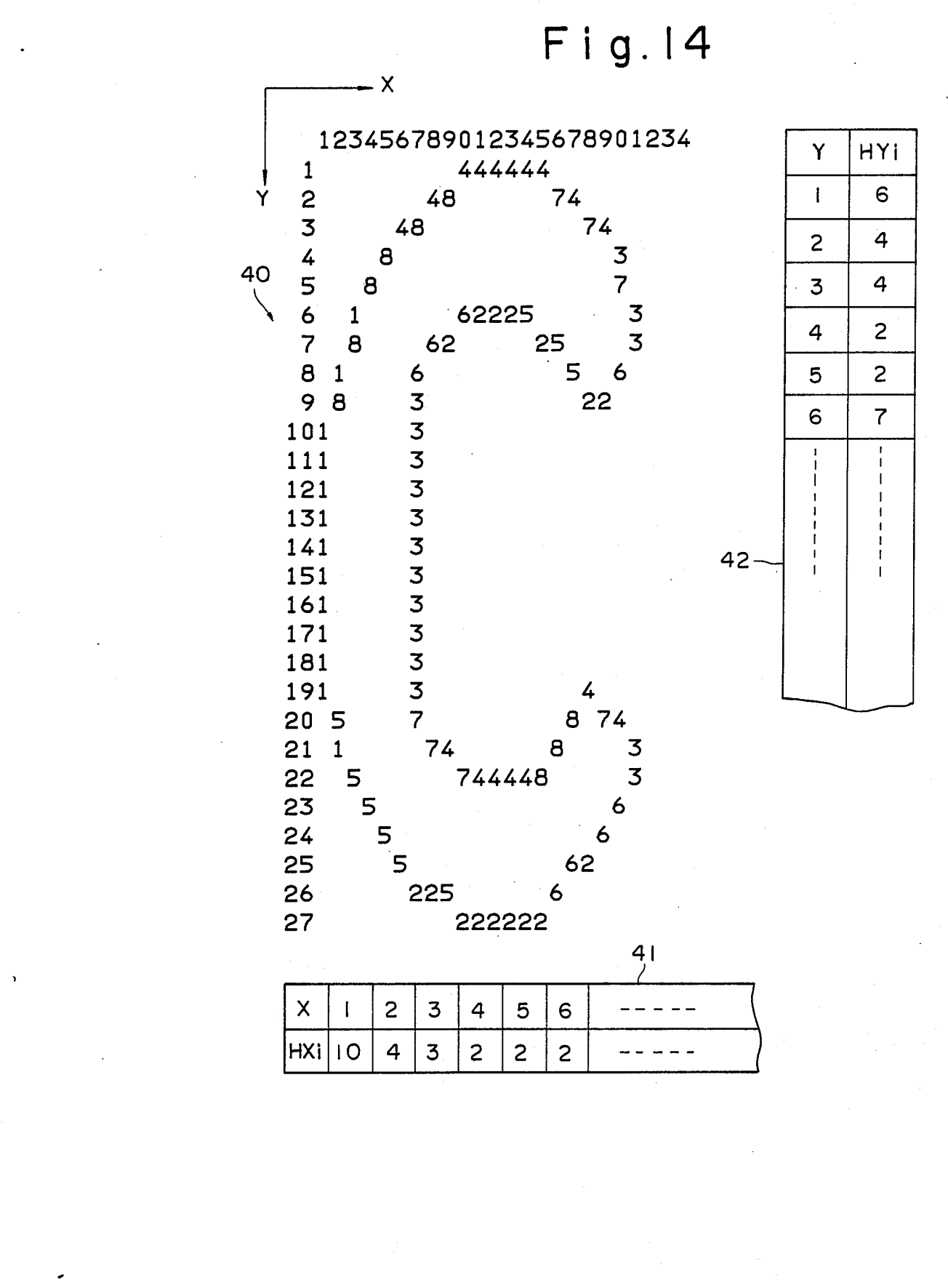

A binary input character image is subjected to a preprocessing step and then a directionality code assigning step (feature application step) is applied in accordance with a predetermined algorism. At the same time, the total number PE of the pixels (feature applied pixels) to which the directionality codes have been assigned is counted, and a projected histrogram HXi onto X axis as well as a projected histogram HYj onto Y axis of the code assigned pixels are obtained. A particular example of such a pair of histograms is illustrated in FIG. 14. As shown, a code-assigned character image 40 formed from a letter "c" is shown and a series of numerals indicated at top shows the lowermost bit of X address with a series of numerals at left showing Y address, the rest of the numerals indicating the directinality codes assigned to the contour of the input character "c". It is to be noted that in this example and also in the latter examples the horizontal direction is taken for X axis and the vertical direction is taken for Y axis; however, this relation may be reversed, if desired.

In FIG. 14, a histogram HXi of number of the directionality codes of the code-assigned character image 40 projected onto X axis and a histogram HYj of the number of the directionality codes of the image 40 onto Y axis are stored in the form of tables 41 and 42, respectively. Thereafter, the character image 40 is subdivided into N sections in X direction and M sections in Y direction, thereby providing a plurality of subdivided sub-regions in an M×N mesh form.

Figure 15:
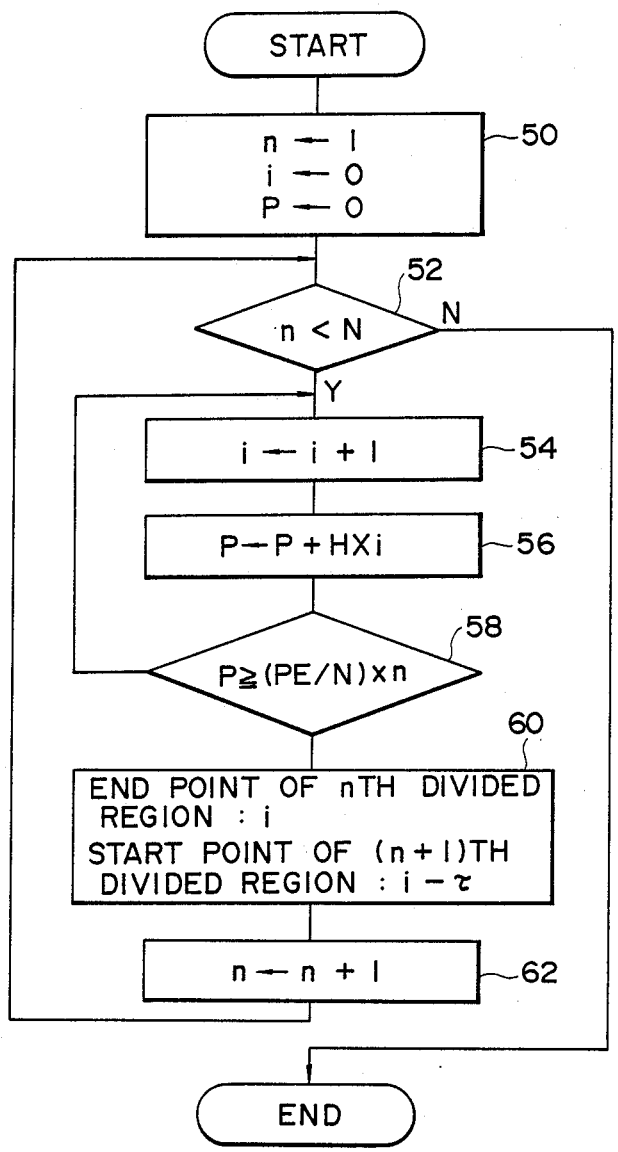
FIG. 15 is a flow chart showing the sequence of steps of a character subdividing process which may be advantageously applied to the character recognition method shown in FIG. 8.

FIG. 15 shows in flow chart a process for determining the locations of subdivisions in X direction and this process will now be described in detail below. After initialization of counters n and i and register P (step 50 of FIG. 15), the counter i is incremented (step 54) and then the value corresponding to this value i is read out of the histogram HXi and added to the value of register P, thereby resetting the value of register P (step 56). Then, it is checked whether or not the value P of register P has exceeded the value of (PE/N)Xn (step 58). If its result is negative, then it goes back to step 54 to repeat a similar operation. In substance, in accordance with these steps, while incrementing X address by 1, the character image is raster-scanned to count the number P of pixels to which the directionality codes have been assigned and to compare the count with a predetermined value of (PE/N)Xn. However, to repeat such a raster scan operation and furthermore a raster scan operation to determine the total number PE is redundant and not efficient. Under the circumstances, in accordance with this example, at the step of assigning the directionality codes to the contour of a character image, which requires a raster scanning operation, the total number PE as well as projected histrograms HXi and HYj are obtained simultaneously, and these data are utilized to avoid unnecessary repetition of raster scanning operation.

Now, when the condition of P being equal to or larger than (PE/N)Xn has been reached, the current count value of counter i is stored as a X address of an end point of the nth sub-region in X direction and another X address which is obtained by subtracting a predetermined region overlapping amount T from that X address is stored as an X address of a start point of the (n+1)th sub-region in X direction (step 60). It is to be noted that the start point of the 1st sub-region in X direction coincides with the left-hand side (X=0) of the character image or frame and the end point of the final and Nth sub-region in X direction coincides with the right-hand side of the character image or frame. Following step 60, the counter n is incremented (step 62), and it proceeds to steps to determine the next subdividing location. This process is terminated when the condition of n=N has been obtained at step 52.

Subdividing locations in Y direction may be obtained in a similar manner. That is, in this case, instead of counter i, use is made of counter corresponding to Y address, and reference is made of projected histogram HYj corresponding to Y axis. In addition, it should be noted that the start point for the 1st sub-region in Y direction corresponds to the top side of the character image or frame and the end point for the Mth sub-region in Y direction corresponds to the bottom side of the character image or frame. In this manner, subdividing locations have been determined in X and Y directions so that the character image is divided into a N×M mesh sub-regions in X and Y directions.

Figure 16:
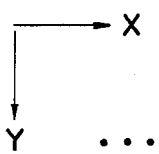
FIG. 16 is an illustration showing the result of character subdivision implemented by the process shown in FIG. 15.

FIG. 16 illustrates an example of mesh subdivisions of a handwritten Japanese katakana character "nu" with the region overlapping amount set at 1. Japanese katanaka characters "nu" and "su" are similar in shape like "E" and "F" in English and the only difference between "nu" and "su" resides in the fact that "nu" has an additional stroke going from left to right downwardly as illustrated in FIG. 16. Thus, in order to make clear distinctions between "nu" and "su", it is important that this feature, i.e., presence of an additional stroke going from left to right downwardly, be reflected properly in sub-regions subdivided in the form of a mesh. The present example satisfies this requirement and thus is capable of clearly differentiating "nu" from "su" and other similar characters.

EXAMPLE 2

Figure 17:
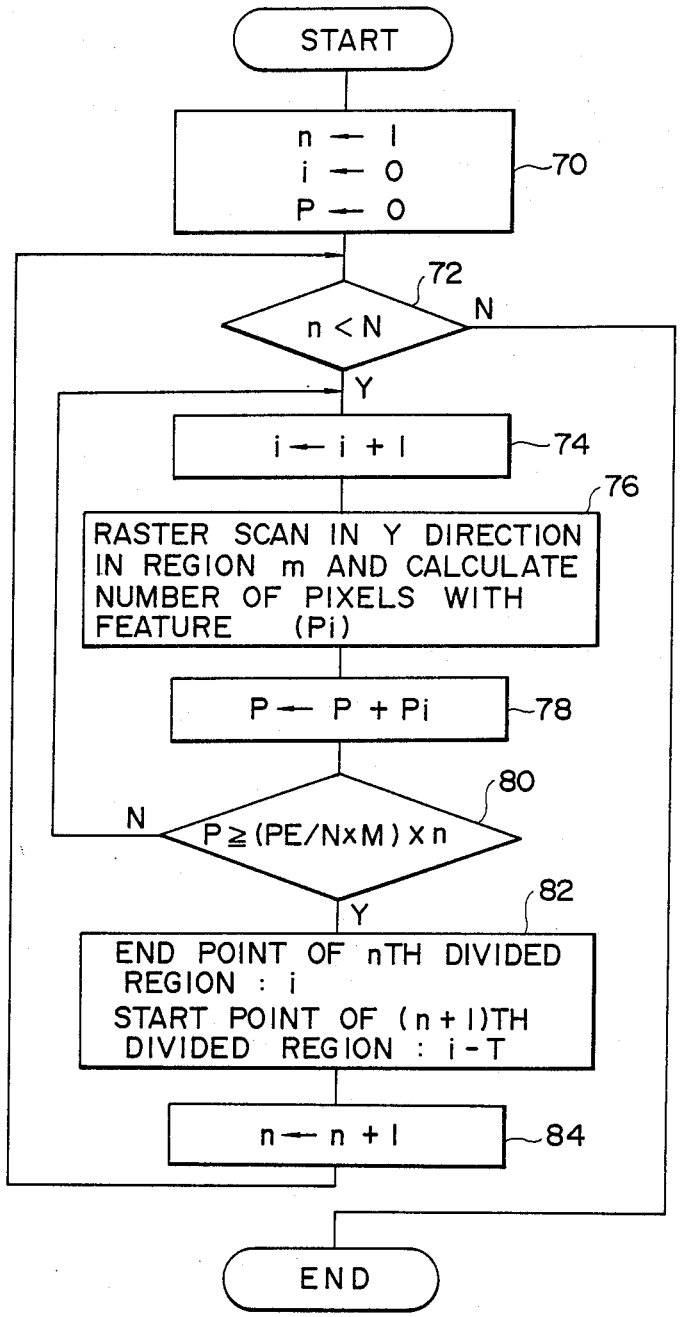
FIG. 17 is a flow chart showing the sequence of steps of another character subdividing process which may also be advantageously applied to the character recognition method shown in FIG. 8.

In this example, simultaneously with the directionality code assigning step, the total number PE of the pixels to which the directionality codes have been assigned and a histogram HYj of the pixels, to which the directionality codes have been assigned, projected onto Y axis are obtained. Then, in a manner similar to the above-described example 1, the character image is divided into a plurality of M sections in Y direction. And, then, while raster scanning each of the sections divided in Y direction, the section is also divided into a plurality of N sections in X direction. FIG. 17 is a flow chart showing a process for further dividing one of the M sections divided in Y direction into N sections in X direction.

Described more in detail in this respect with particular reference to FIG. 17, upon initialization of counters n and i and register P (step 70), the counter i is incremented (step 74) and the character image is raster-scanned in Y direction for the X address corresponding to the incremented i, whereby the number of pixels, to which the directionality codes have been assigned, in that line is counted and its value Pi is added to register P (step 78). Then, it is checked whether or not the value P of register P has exceeded a predetermined value of (PE/NXM)Xn (step 80). If the result is negative, then it goes back to step 74 and to repeat a similar process. On the other hand, if P has been found to be equal to or larger than (PE/NXM)Mn, the current count value of counter i is stored as an X address of an end point for the nth sub-region in X direction, and another X address obtained by subtracting a predetermined region overlapping width T from that X address is stored as a X address of a start point of the (n+1)th sub-region in X direction (step 82). It should be noted that the start point of the 1st sub-region in X direction corresponds to the left-hand side (X=0) of the character image or frame and the end point of the final and thus Nth subregion in X direction corresponds to the right-hand side of the character image or frame. After step 82, the counter n is incremented (step 84) and steps are carried out to determine the next subdividing position. This process is terminated as soon as the condition of n=N has been reached at step 72.

Figure 18:
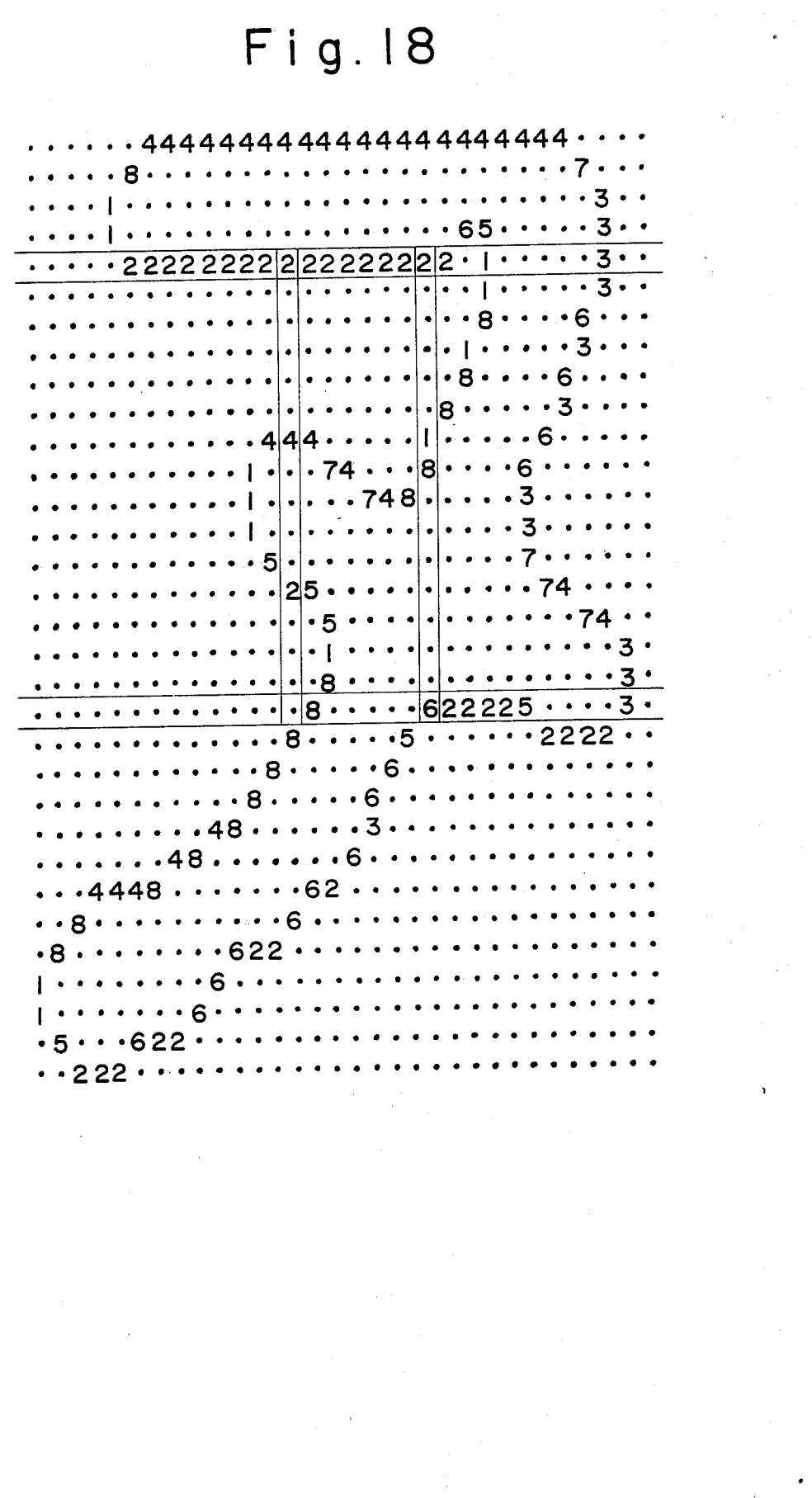

In this manner, subdividing locations in X and Y directions are obtained and the character image or frame is divided into a plurality of sub-regions in the form of an N×M mesh in X and Y directions. An example of such subdivisions of Japanese katakata character "nu" is illustrated in FIG. 18. It is to be noted that in FIG. 18 only subdivisions in X direction for the intermediate divided sections in Y direction are indicated. It should also be noted that the condition of T=0 has been assumed in FIG. 18.

In the above-described example 2, subdivisions in Y direction are carried out by the scheme described in example 1. However, it may also be carried out such that after implementation of subdivions in X direction, subdivisions in X direction may be carried out for each of the subdivisions in Y direction.

EXAMPLE 3

If the pixels, to which the directionality codes have been assigned, are concentrated in a region overlapping portion, there is produced an increased scatter in the number of pixels within sub-regions in each of X and Y directions. In this case, if subdividing locations were determined using PE/(NXM) as a reference as in the above-described example 2, there would appear a situation where subdivisions are improper. This example 3 is directed to obviate such a disadvantage.

Figure 19:
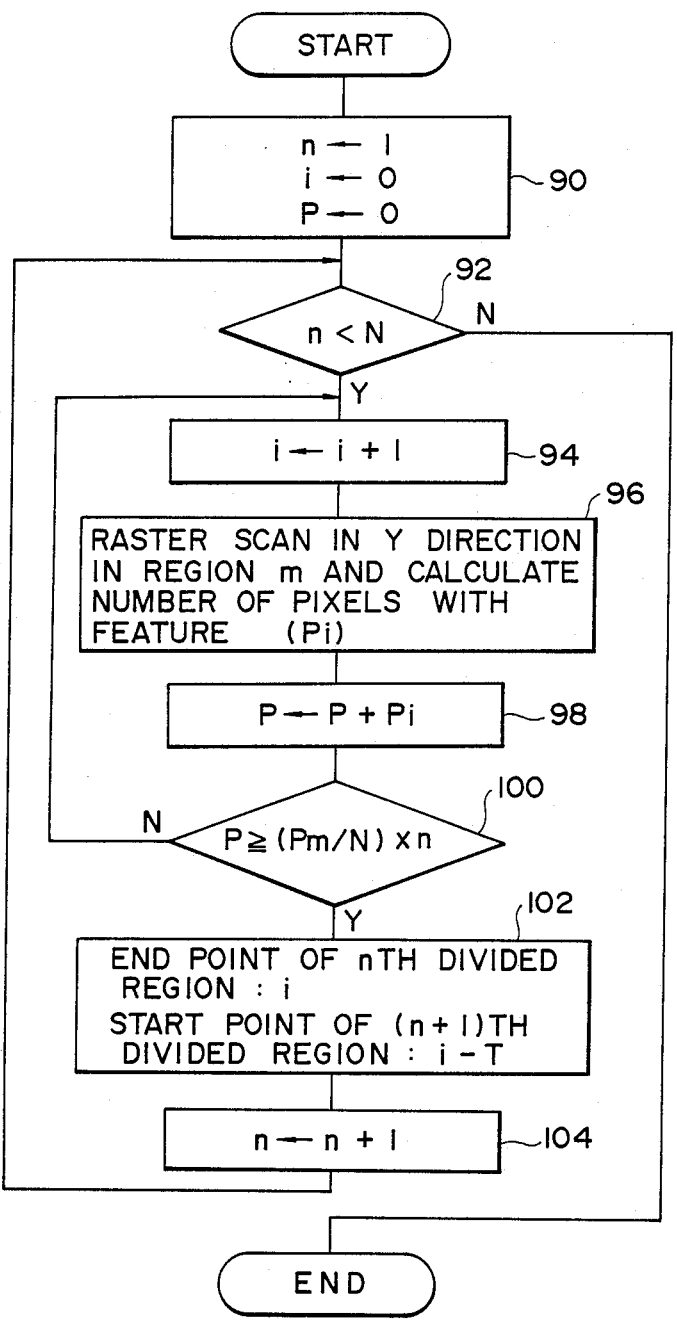
FIG. 19 is a flow chart showing the sequence of steps of a further character subdividing process which may also be advantageously applied to the character recognition method shown in FIG. 8.

That is, in accordance with this example 3, simultaneously with the directionality code assigning step, the total number PE of the pixels, to which the directionality codes have been assigned, and a histogram HYj of the code-assigned pixels projected onto Y axis are obtained, and, then, the character image is subdivided into M sections in Y direction in a manner similar to that described in the above example 1. During this subdivisions in Y direction, reference is made to histogram HYj and the number Pm of code-assigned pixels in each of the subdivisions is obtained. Then, while raster scanning each of the subdivisions divided in Y direction, each of the subdivisions is further divided into N subdivisions in X direction. FIG. 19 shows a flow chart illustrating a process of dividing one of the subdivisions divided into Y direction into N subdivisions in X direction.

Described more in detail in this regard with particular reference to FIG. 19, upon initialization of counters n and i and register P (step 90), the counter i is incremented (step 94) and the character image is raster-scanned in Y direction for the X address which corresponds to that count value i, whereby the number of code-assigned pixels in that line is counted and its counted value Pi is added to the register P (step 98). And, then, the value P of register P is checked to see whether or not it has exceeded a predetermined value of (Pm/N)Xn (step 100). If the result is negative, then it goes back to step 94 to repeat similar steps. On the other hand, if the condition of P being equal to or larger than (Pm/N)Xn has resulted, the current count value of counter i is stored as a X address of an end point for the nth sub-region in X direction and moreover another X address obtained by subtracting a region overlapping width T from that X address is stored as a X address of a start point of the (n+1)th sub-region in X direction (step 102). It is to be noted that the start point of the lst sub-region in X direction corresponds to the left-hand side (X=0) of the character image and the end point of the final and thus Nth sub-region in X direction corresponds to the right-hand side of the character image. Subsequent to step 102, the counter n is incremented (step 104) and it proceeds to steps to determine the next subdividing point. This process is terminated upon reaching the condition of n =N.

Figure 20:
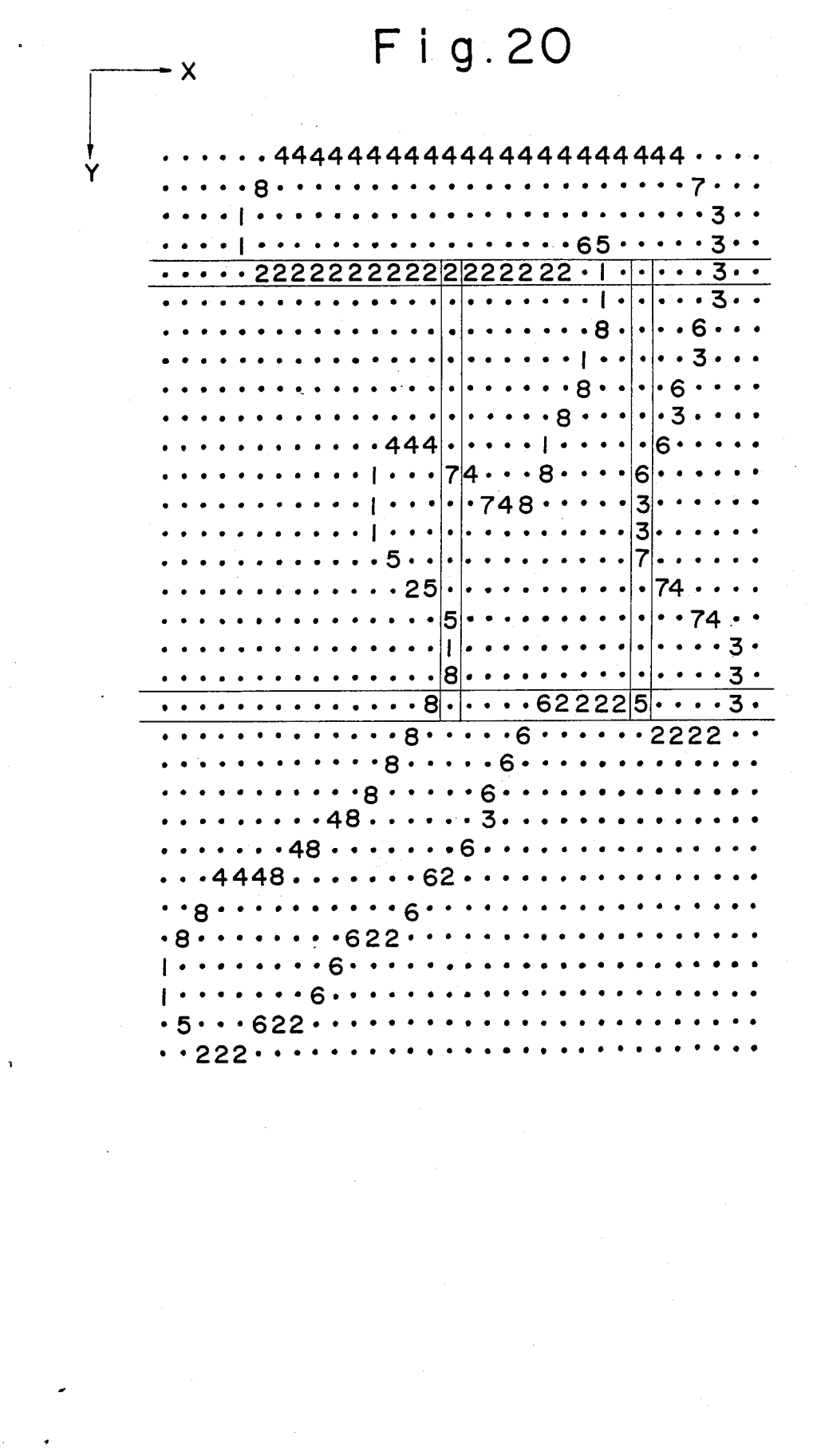

Utilizing the subdividing points in X direction thus obtained, the sections subdivided in Y direction are also subdivided into N sections in X direction, so that the character image comes to be subdivided into a mesh of N×M sub-regions. FIG. 20 illustrates an example which has been obtained by subdividing the code-assigned character image of a handwritten Japanese katakana character "nu" into a mesh of sub-regions with T=1. It is to be noted that subdivisions in X direction are only indicated for the intermediate subdivided sections in Y direction.

EXAMPLE 4

The same process steps as those used in example 1 are used excepting the usage of a set of directionality codes for black pixels for the black pixels defining the contour of a binary character image.

EXAMPLE 5

The same process steps as those used in example 2 are used excepting the usage of a set of directionality codes for black pixels for the black pixels defining the contour of a binary character image.

EXAMPLE 6

The same process steps as those used in example 3 are used excepting the usage of a set of directionality codes for black pixels for the black pixels defining the contour of a binary character image.

It is to be noted that each of the process steps described above in this aspect of the present invention can be implemented with ease either by software or hardware, or a combination of both and it should be obvious for one skilled in the art.

Now, a further aspect of the present invention will be described with particular reference to FIGS. 21 through 30. This aspect of the present invention is particularly oriented to a character subdividing scheme suitable for use in feature extraction in a character recognition method and system. That is, it is important to subdivide a character image optimally depending on the condition of the character image to be subdivided so as to extract a desired feature without failure. FIG. 30a illustrates a code-assigned character image which has been obtained by assigning a set of directionality codes shown in FIG. 22 to the contour of a binary character image for a Japanese katakanta character "wu". And, FIG. 30b is a similar code-assigned character image for the same Japanese katakana character "wu" with slight modification in shape. First, let us consider the case in which both of these character images shown in FIGS. 30a and 30b are subdivided into a mesh of 3×3 using fixed locations of subdivisions and a histogram as a function of directionality codes for each of the subdivisions is formed to produce a feature vector.

In the Japanese katakata characters, there are "wu" and "nu" which are similar in shape and "wu" differs from "nu" in shape because of the presence of a vertically extending top central stroke. Thus, in order to properly differentiate "wu" from "nu", it is important that the information relating to this top central stroke be properly extracted by character subdivisions and properly reflected in a feature vector. Taking a closer look at the top left sub-region in each of the character images shown in FIGS. 30a and 30b, the information relating to the top central stroke has been lost for the character image shown in FIG. 30a; whereas, this information is present in the character image shown in FIG. 30b. In this manner, if the subdividing points are fixed in locations, there may encounter a situation in which feature extraction faithfully reflecting the feature of a character cannot be carried out. This third aspect of the present invention is particularly directed to obviate such a problem and to provide a method of optimally determining subdividing points of a character image so as to allow to carry out feature extraction stably at all times.

Figure 21A:
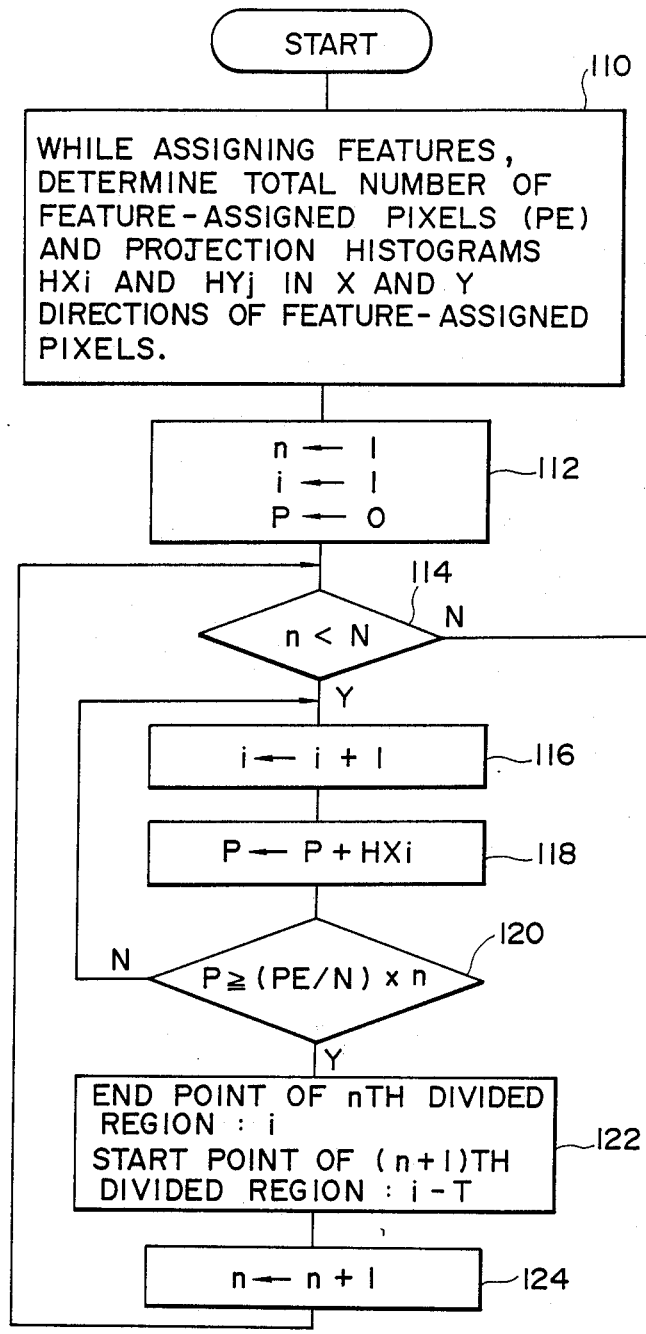
FIGS. 21a and 21b, when combined as shown in FIG. 21, illustrate a flow chart showing the sequence of steps of a character subdividing process which is constructed in accordance with one embodiment of the present invention and which may advantageously be applied to a character recognition method.
Figure 21B:
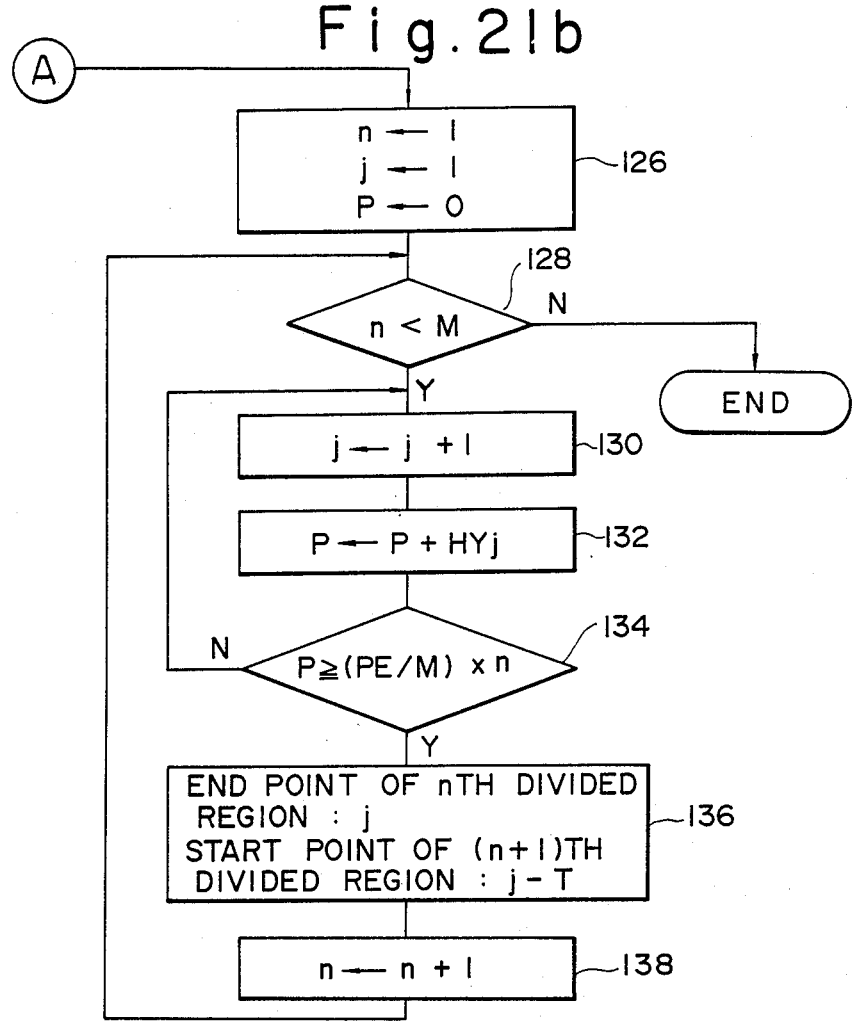
Figure 21:
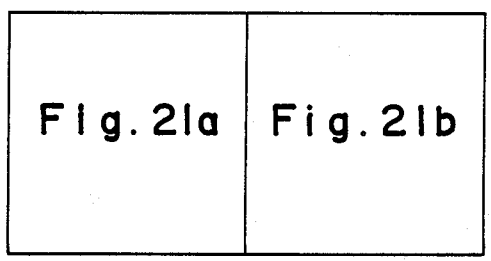
FIG. 21 is an illustration showing how to combine FIGS. 21a and 21b.

FIGS. 21a and 21b, when combined as shown in FIG. 21, define a flow chart showing a sequence of steps of a character region (frame) subdividing method constructed in accordance with one embodiment of this aspect of the present invention. As indicated previously, it is to be noted that this character subdividing method is particularly advantageous when applied to a character recognition process.

Figure 22:
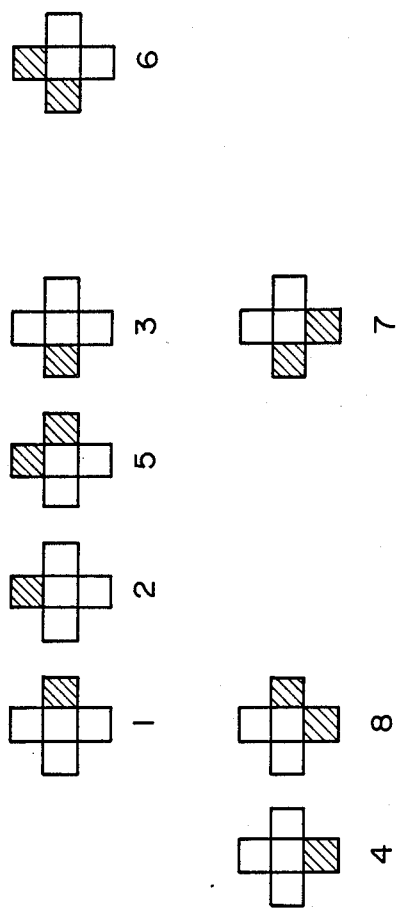
FIG. 22 is an illustration showing a plurality of directionality codes which basically correspond to the directionality codes shown in FIG. 6.

As shown in FIGS. 21a and 21b, at step 110, a character image, typically obtained by scanning a printed or handwritten character, is processed to assign a predetermined feature to the character image. By this feature assignment step, a plurality of directionality codes as shown in FIG. 22 are selectively assigned to the white pixels boardering the contour of the character image. As mentioned previously, another set of directionality codes may be used for selective assignment to the black pixels defining the contour of the character image. Such a feature assignment step is typically carried out by examining a pixel pattern defined by a pixel of interest, a pair of right-hand and left-hand pixels and a pair of top and bottom pixels while raster scanning the character image. Simultaneously therewith, the total number PE of the code-assigned pixels (feature pixels) and projected histograms HXi and HYj on X and Y axes are obtained and stored in tables. One example of such tables is shown in FIG. 23.

Figure 23:
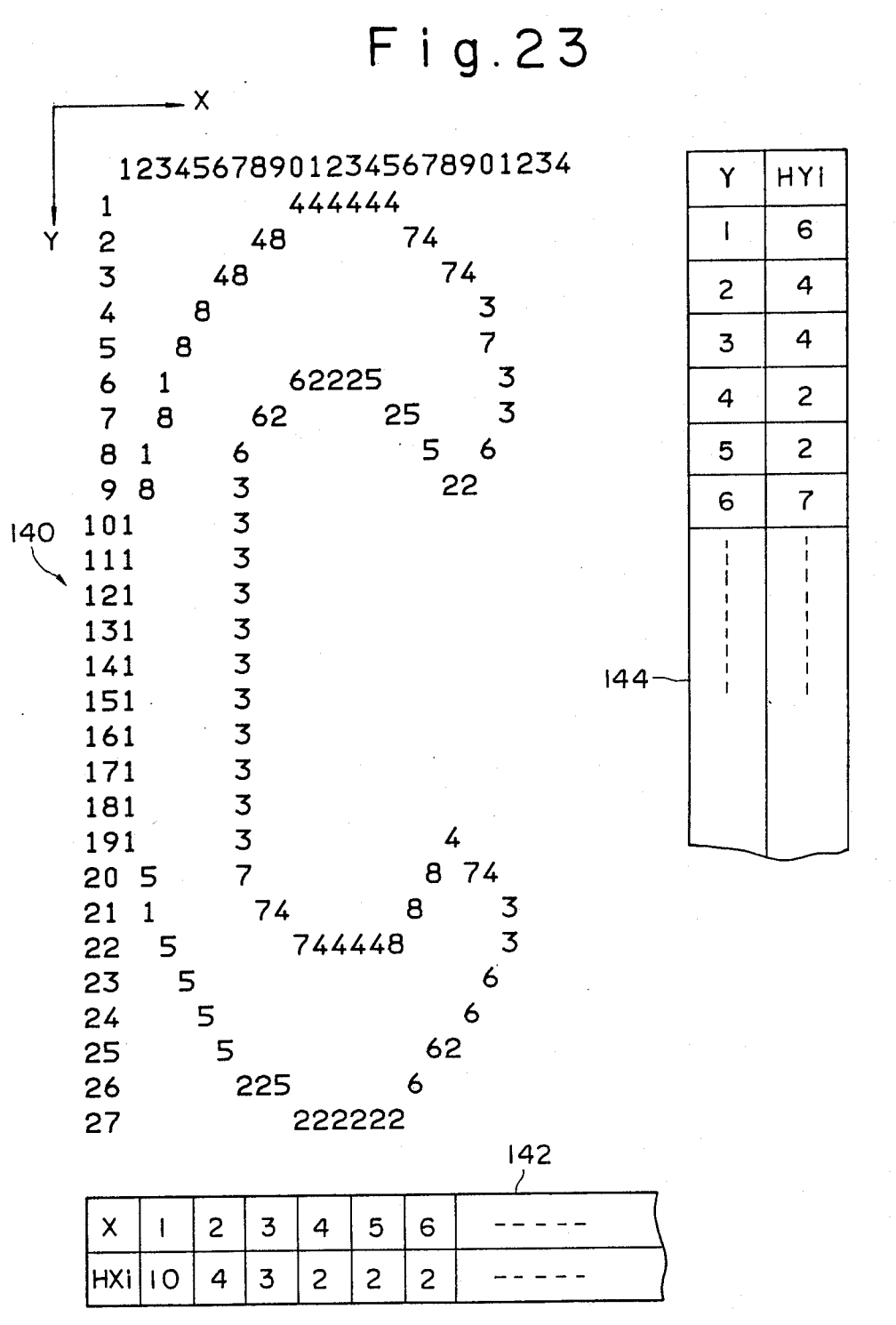

In FIG. 23, there is shown a character image 140 to which a plurality of predetermined directionality codes have already been assigned selectively. A series of numerals at top of FIG. 23 indicates the lowermost bit of X address and a series of numerals at left of FIG. 23 indicates Y address. A projected histogram HXi of the feature pixels of the character image 140 onto X axis and a similar projected histogram HYj onto Y axis are stored in tables 142 and 144, respectively. The counting of the total number of such feature pixels and formation of such histogram tables can be effected upon completion of the feature assignment step; however, preferably, they are implemented simultaneously with the feature assignment step because it thus allows to reduce the number of scanning the character image, thereby shortening the processing time period.

Next, the character image is divided into N sections in X direction (steps 112-124) and into M sections in Y direction (steps 126-138), whereby the character image is divided into a mesh of N×M sub-regions, each of which contains feature pixels as much as uniformly. By so doing, subdivision of a character image can be carried out optimally depending on the degree of deformation of the character image from its standard shape.

Described more in detail with respect to this character subdividing processing, upon initialization of counters n and i and register P (step 112), counter i is incremented (step 116), and the value of histogram HXi corresponding to this value i is read from the table and added to the current value of register P, thereby resetting the value of register P (step 118). Then, it is checked whether or not the value of register P has exceeded a predetermined value of (PE/N)Xn (step 120). If the result is negative, then it goes back to step 114 to repeat similar steps. In effect, in this routine, while incrementing X address by 1, the character image is raster scanned to count the number P of feature pixels and the count is compared with (PE/N)Xn. However, to repeat such raster scan and moreover the raster scan to count the total number PE is not efficient. Under the circumstances, in accordance with the present embodiment, during the feature assigning step, which necessitates raster scanning, histograms HXi and HYj and total number PE are simultaneously obtained, and these data are used appropriately in the routine, thereby removing the necessity to carry out raster scanning repetitively and providing an increased efficiency.

If the condition of P being equal to or larger than (PE/N)Xn has been obtained, the current count value of counter i is stored as a X address of an end point of the nth sub-region in X direction, and another X address obtained by subtracting a region overlapping width T from that X address is stored as a X address of a start point of the (n+1)th sub-region in X direction (step 122). It is to be noted that the start point of the 1st sub-region in X direction corresponds to the left-hand side (X=0) of the character image and the end point of the final and thus Nth sub-region in X direction corresponds to the right-hand side of the character image.

Subsequent to step 122, counter n is incremented (step 124), and the processing to determine the next subdiving point is implemented. This processing is terminated as soon as the condition of n=N has been reached at step 112. The process steps 126-138 for subdivisions in Y direction are similar to the steps 112-124 described above. However, instead of counter i associated with X address, use is made of counter j which is associated with Y address (steps 126, 130, 136). In addition, instead of histogram HXi, reference is made to histogram HYj (step 132), and the number of subdivisions at step 134 is set at M. If the result at determination step 134 is affirmative, then it proceeds to step 136 where the current count value j of counter j is set as Y address of an end point of the nth sub-region in Y direction and a value obtained by subtracting a region overlapping width T from that Y address is determined as Y address of a start point of the (n+1)th sub-region in Y direction. It should be noted that the start point of the 1st sub-region in Y direction coincides with the top side of the character image and the end point of the Mth sub-region in Y direction coincides with the bottom side of the character image. Since the subdividing points have been determined in X and Y directions in this manner, the character image is then subdivided into a mesh of N×M sub-regions in X and Y directions based on these subdividing points.

Figure 24A:
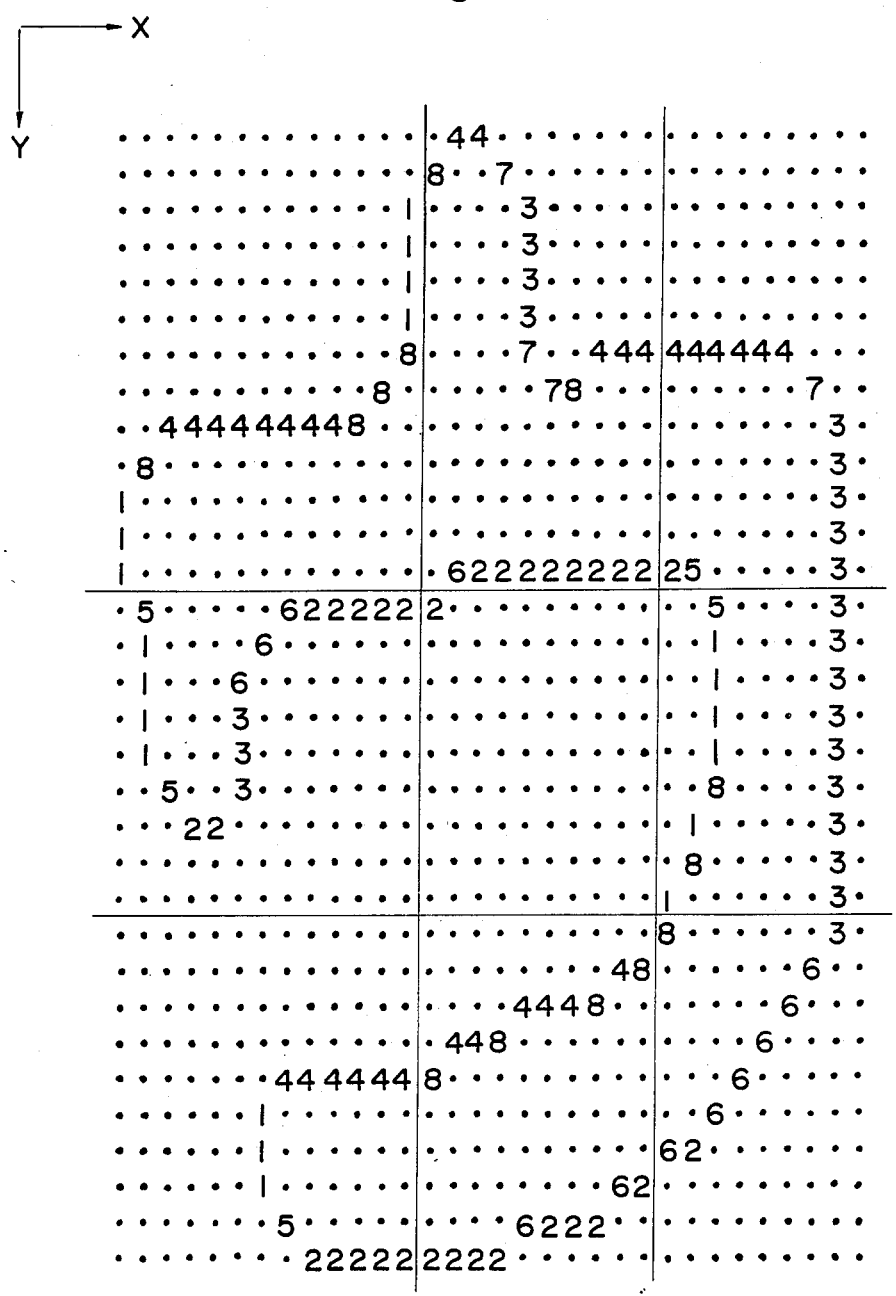
Figure 24B:
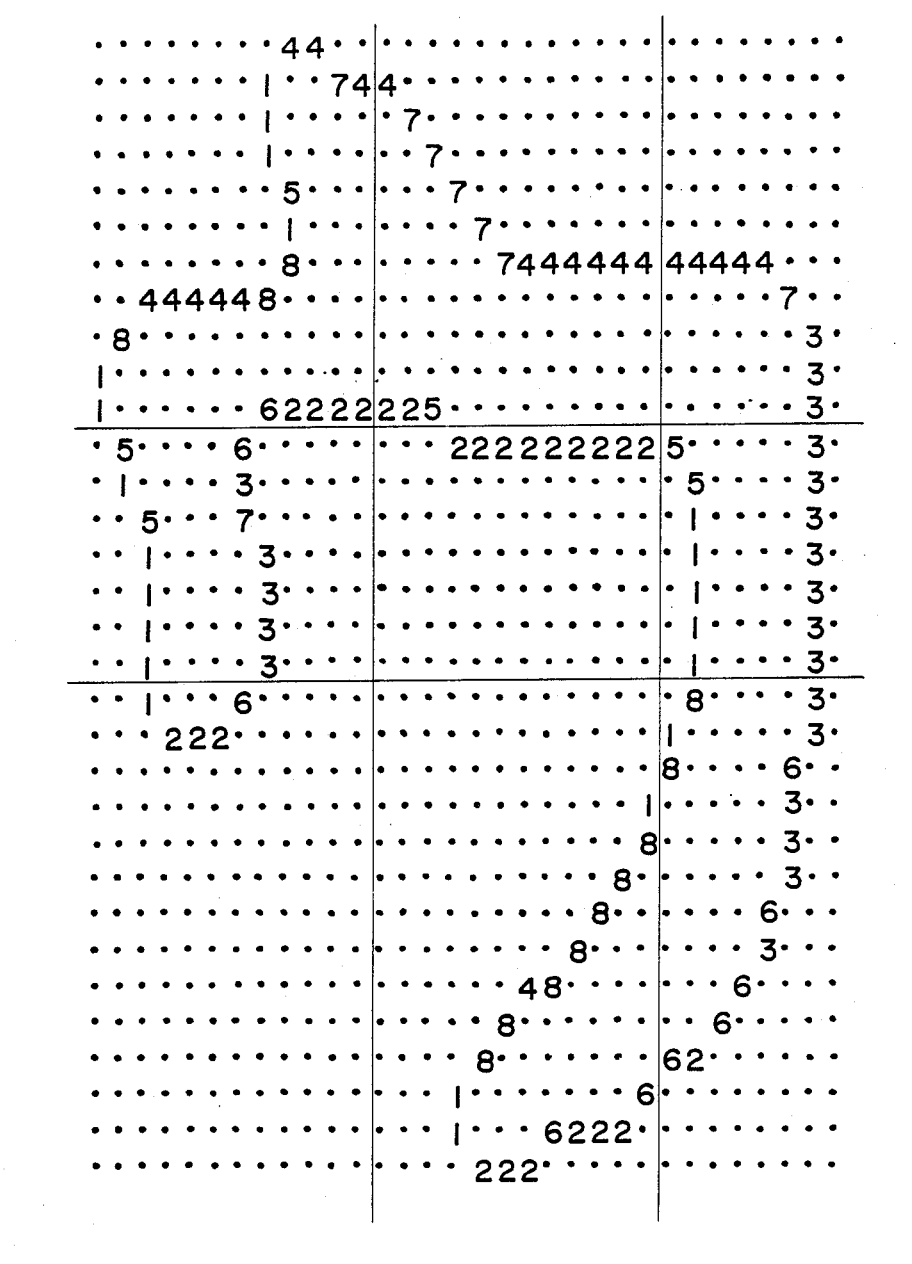

In accordance with the present embodiment, those character images shown in FIGS. 30a and 30b are subdivided as shown in FIGS. 24a and 24b, respectively. It is to be noted that the conditions of N=M=3 and T=0 have been assumed. A quick examination of the top left sub-region in FIG. 24a indicates the presence of information of the top central stroke of the character "wu" which is not the case when processed using the prior art fixed point subdivision scheme. The same arguments hold true for the case shown in FIG. 24b.

Figure 25A:
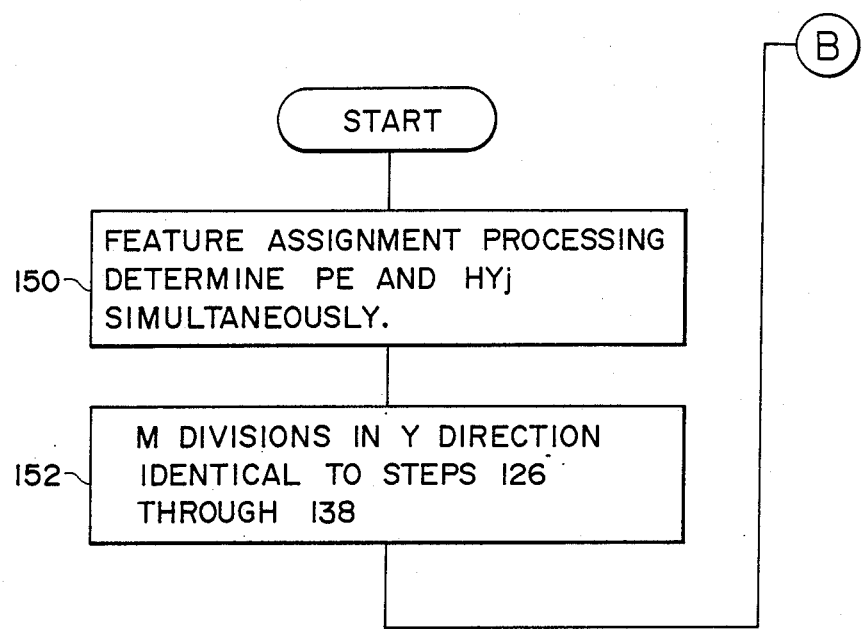
FIGS. 25a and 25b, when combined as shown in FIG. 25, illustrate a flow chart showing the sequence of steps of another character subdividing process which is constructed in accordance with another embodiment of the present invention and which may also be advantageously applied to a character recognition method.
Figure 25:
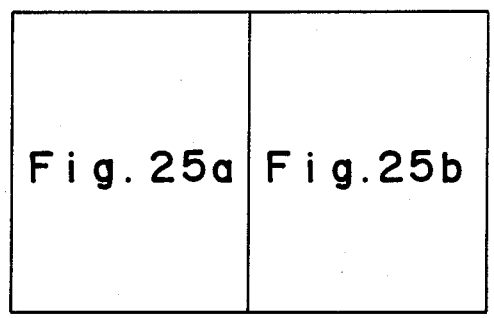
FIG. 25 is an illustration showing how to combine FIGS. 25a and 25b.
Figure 25B:
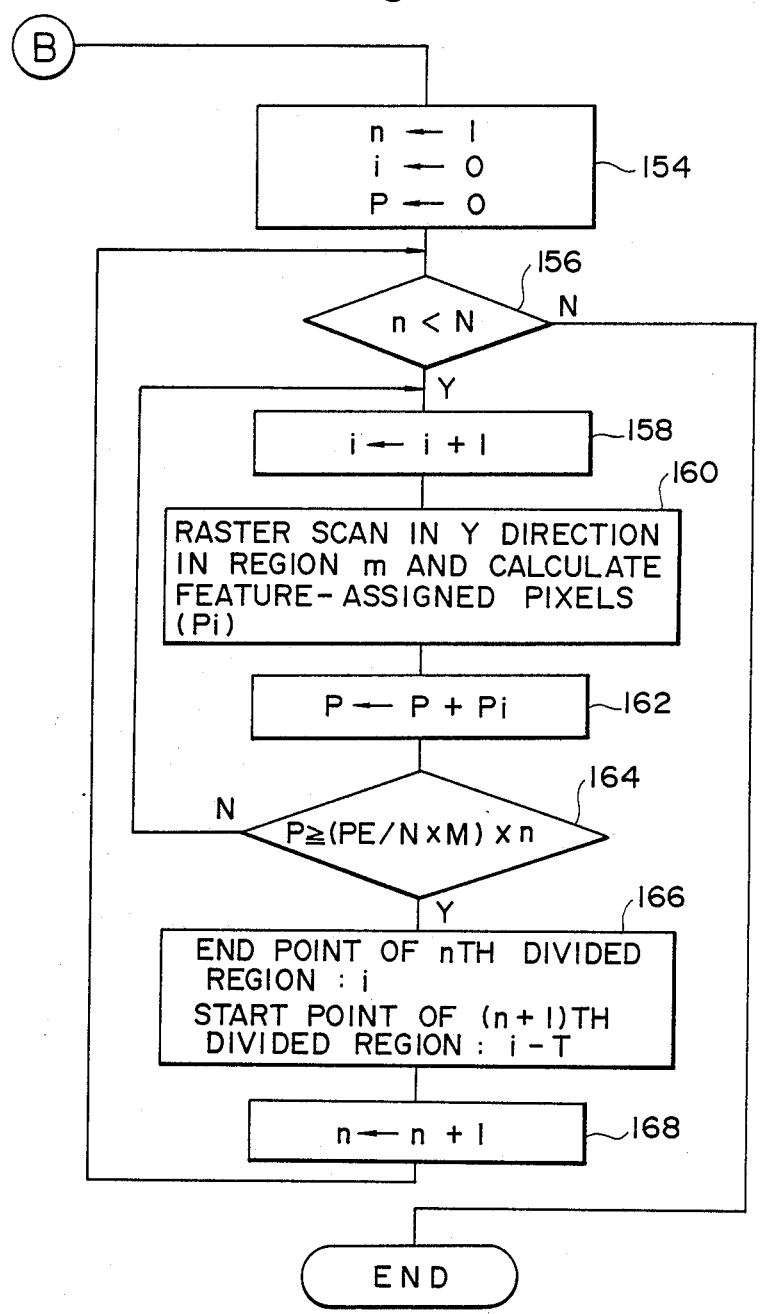

Referring now to FIGS. 25a and 25b, another embodiment of this aspect of the present invention will be described. Step 150 of this embodiment corresponds to step 110 of the previous embodiment just described above; however, in step 150, as far as histogram is concerned, only HYj is obtained and not HXi. Then, it proceeds to step 152 where the character image is divided into M sections in Y direction and this step corresponds to a sequence of steps 126–138 of the previous embodiment. Steps 154–168 are implemented to subdivide the character image into N sections in X direction. Each of these steps will now be described in detail below.

Upon initialization of counters n and i and register P (step 154), counter i is incremented (step 156) and the character image is raster scanned in Y direction for X address corresponding to count value i, whereby the number of code-assigned pixels in that line is counted (step 160) and its value Pi is stored in register P (step 162). Then, it is checked whether or not the value P of register P has exceeded a predetermined value of (PE/(NXM)Xn) at step 164. If the result is negative, then it goes back to step 158 to repeat similar steps. On the other hand, if the condition of P being equal to or larger than (PE/(NXM)Xn) has been obtained, the current count value i is stored as a X address of an end point of the nth sub-region in X direction and another X address obtained by subtracting a region overlapping amount T from that X address is stored as a X address of a start point of the (n+1)th sub-region in X direction (step 166). Similarly, it is to be noted that the start point of the 1st sub-region in X direction corresponds to the left-hand side (X=0) of the character image and the end point of the final and thus Nth sub-region in X direction corresponds to the right-hand side of the character image.

Subsequent to step 166, counter is incremented (step 168) and it proceeds to steps to determine the next subdividing point. This process is terminated when the condition of n =N has been obtained at step 156. In this manner, subdividing points in X and Y directions have been determined, so that the character image is divided into a mesh of N×M sub-regions in X and Y directions.

Figure 26A:
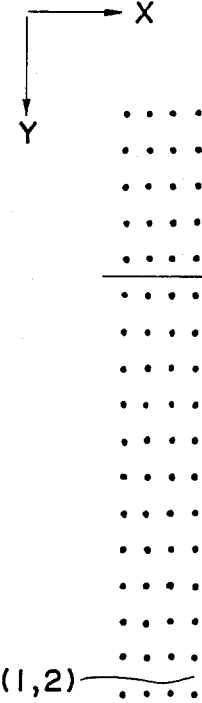
Figure 26B:
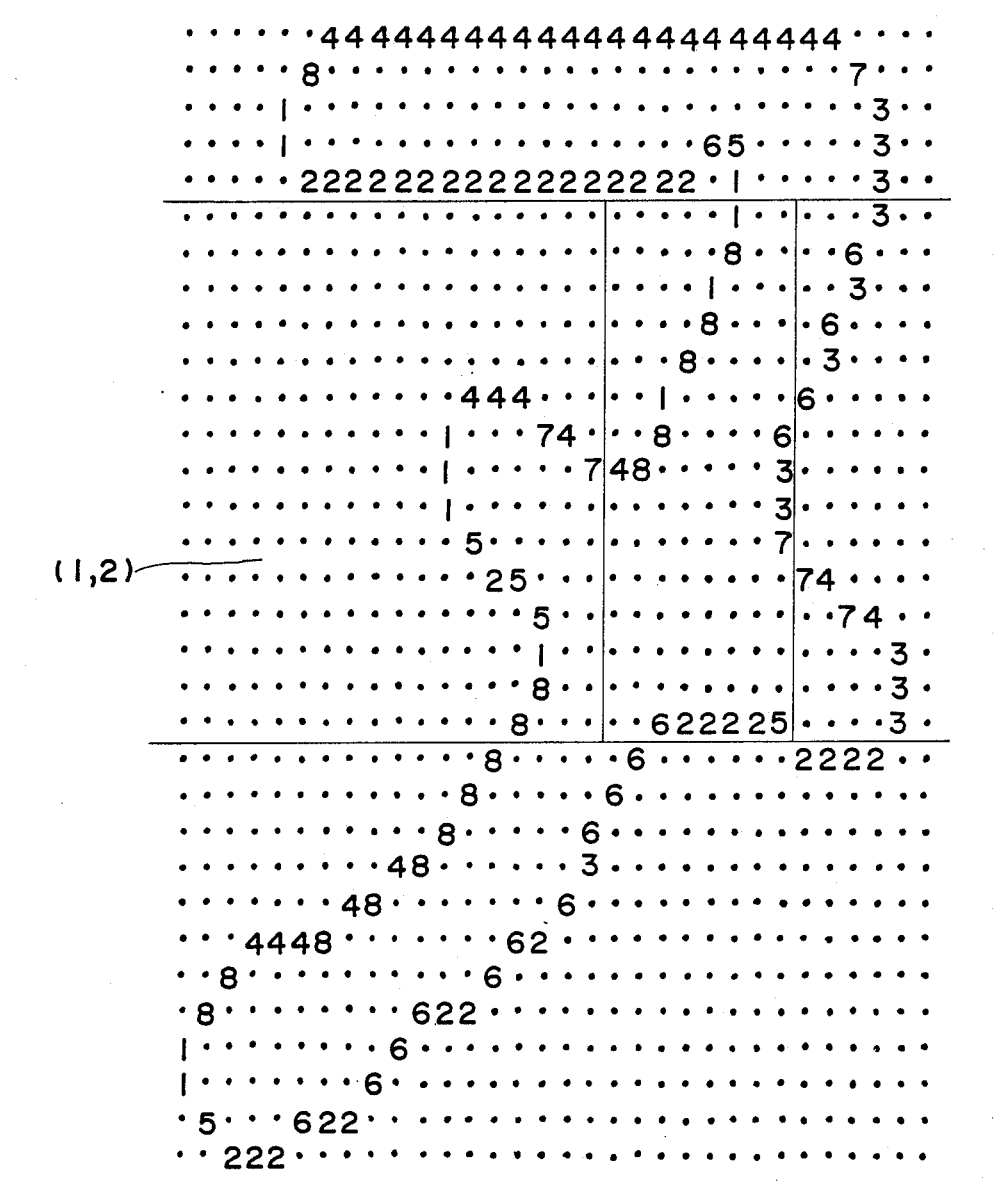

As pointed out previously, Japanese katakana characters "nu" and "su" are similar in shape and "nu" has an additional stroke going from left to right downwardly at the center. Thus, in order differentiate these two characters, this additional stroke plays a key role. If character "nu" is subdivided by the method shown in FIGS. 21a and 21b, the subdivided result will be as shown in FIG. 26a. An examination of the left intermediate sub-region (1,2) in the character image of FIG. 26a reveals the fact that the information regarding the inclined nature of the additional stroke is not present in this sub-region. On the other hand, FIG. 26b illustrates the result when the same character "nu" has been subdivided by the present method shown in FIGS. 25a and 25b. It is to be noted that, in FIG. 26b, subdivisions in X direction are only indicated for the intermediate sub-region in Y direction and the condition of T=0 has been assumed. A quick look at the left intermediate sub-region (1,2) is enough to understand that the sub-region (1,2) includes information which sufficiently indicates the presence of the inclined additional stroke. In this manner, the present embodiment can make up for the disadvantages present in the previous embodiment described with reference to FIGS. 21a and 21b.

In the above description, subdivisions in Y direction have been carried out by the method of the previous embodiment. It should be noted, however, that, after subdivisions in X direction, subdivisions in Y direction may be carried out by a method similar to that shown in FIGS. 25a and 25b for each of the subdivisions in X direction.

Figure 27A:
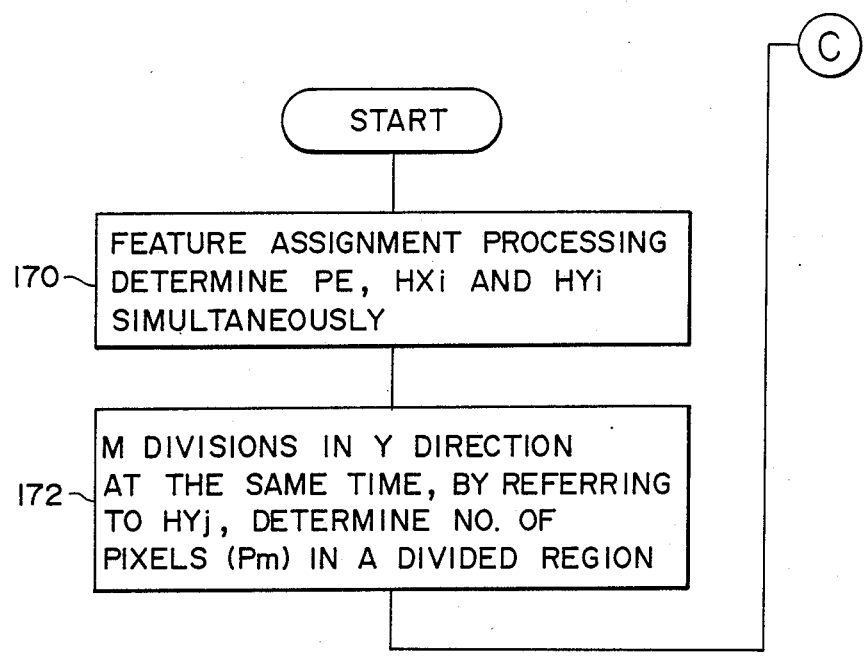
FIGS. 27a and 27b, when combined as shown in FIG. 27, illustrate a flow chart showing the sequence of steps of a further character subdividing process which is constructed in accordance with a further embodiment of the present invention and which may also be advantageously applied to a character recognition method.
Figure 27:
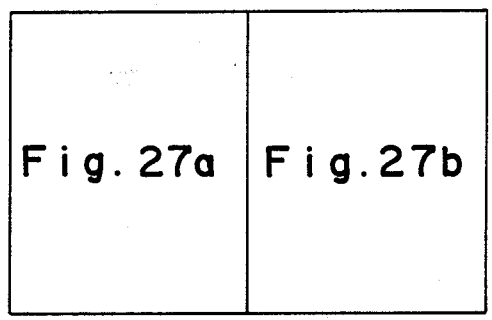
FIG. 27 is an illustration showing how to combine FIGS. 27a and 27b.
Figure 27B:
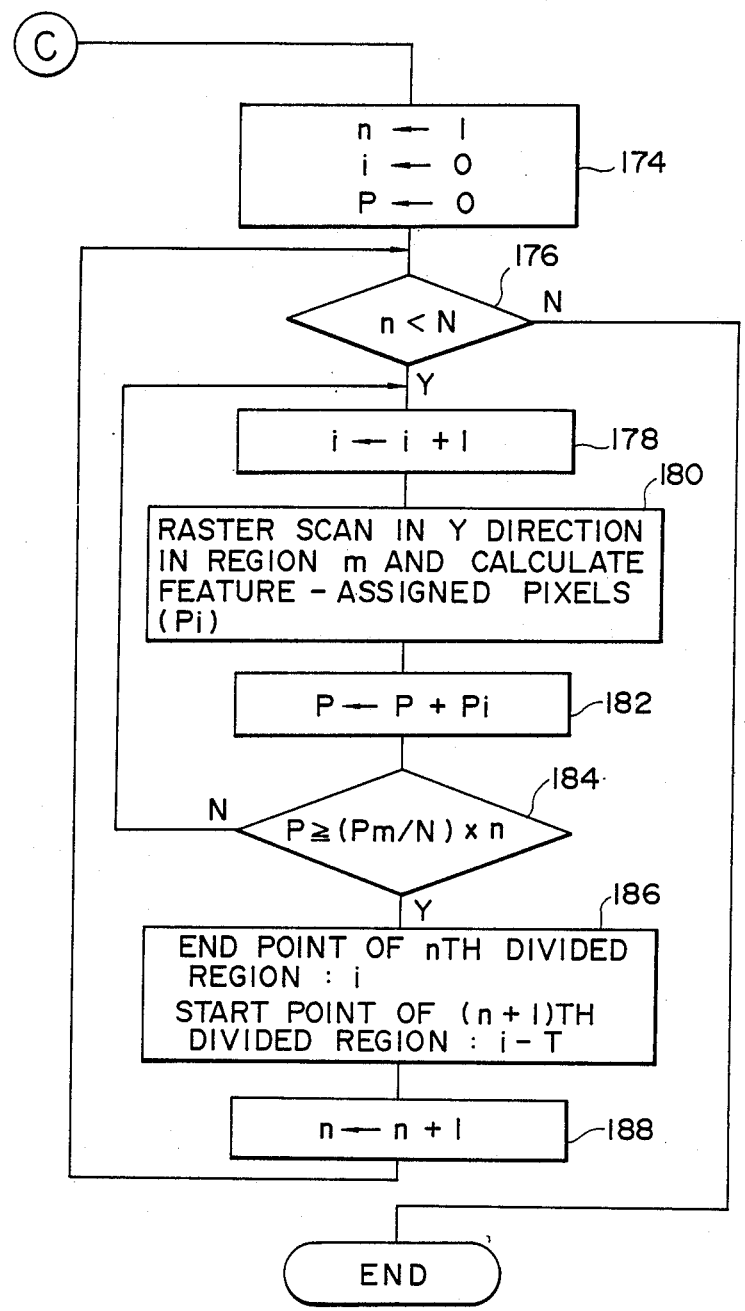

In the embodiment described just above with reference to FIGS. 25a and 25b, in the case where feature pixels (i.e., code-assigned pixels) are concentrated in a region overlapping portion, if subdividing points are determined using PE/(NXM) as a reference, there will be more scatter in the number of pixels among subdivided sub-regions in each of X and Y directions. FIGS. 27a and 27b show a further embodiment of this aspect of the present invention, which is capable of obviating such a problem. In the flow chart shown in FIGS. 27a and 27b, step 170 corresponds to step 110 shown in FIGS. 21a and 21b. Then, it proceeds to step 172 which is a step for subdividing a character image in Y direction and corresponds to a sequence of steps 126 through 138 of the embodiment shown in FIGS. 21a and 21b. However, at step 172, simultaneously with subdivisions in Y direction, reference is made to histogram HYj and the number Pm of feature pixels in each of the sub-regions in Y direction is determined. Then, it proceeds to a sequence of steps 174 through 188, which are the steps to determine subdivisions in X direction. Now, these steps 174 through 188 will be described in detail below.

Upon initialization of counters n and i and register P (step 174), counter i is incremented (step 178), and, then, for X address corresponding to this count value i, the character image is raster scanned in Y direction, whereby the number of code-assigned pixels in that line is counted (step 180) and its value Pi is added to the current value of register P (step 182). Then, it is checked whether or not the value P of register P has exceeded a predetermined value of (Pm/N)Xn at step 184. If the result is negative, then it goes back to step 178 to repeat similar steps. On the other hand, if the condition of P being equal to or larger than (Pm/N)Xn has been attained, the current count value of counter i is stored as a X address of an end point of the nth sub-region in X direction and another X address determined by subtracting a region overlapping amount T from that X address is stored as a X address of a start point of the (n+1)th sub-region in X direction (step 186). As indicated previously, it is to be noted that the start point of the 1st sub-region in X direction corresponds to the left-hand side (X=0) of the character image, and the end point of the final and thus Nth sub-region in X direction corresponds to the right-hand side of the character image.

After step 186, it proceeds to step 188 where counter n is incremented, so that it proceeds to another sequence of steps for determining the next subdividing point. Such a process is terminated as soon as the condition of n=N has been reached at step 176. In this manner, subdividing locations in X direction for each of the subdivided sections in Y direction are determined, so that the character image as a whole is subdivided into a mesh of N×M sub-regions.

Figure 28A:
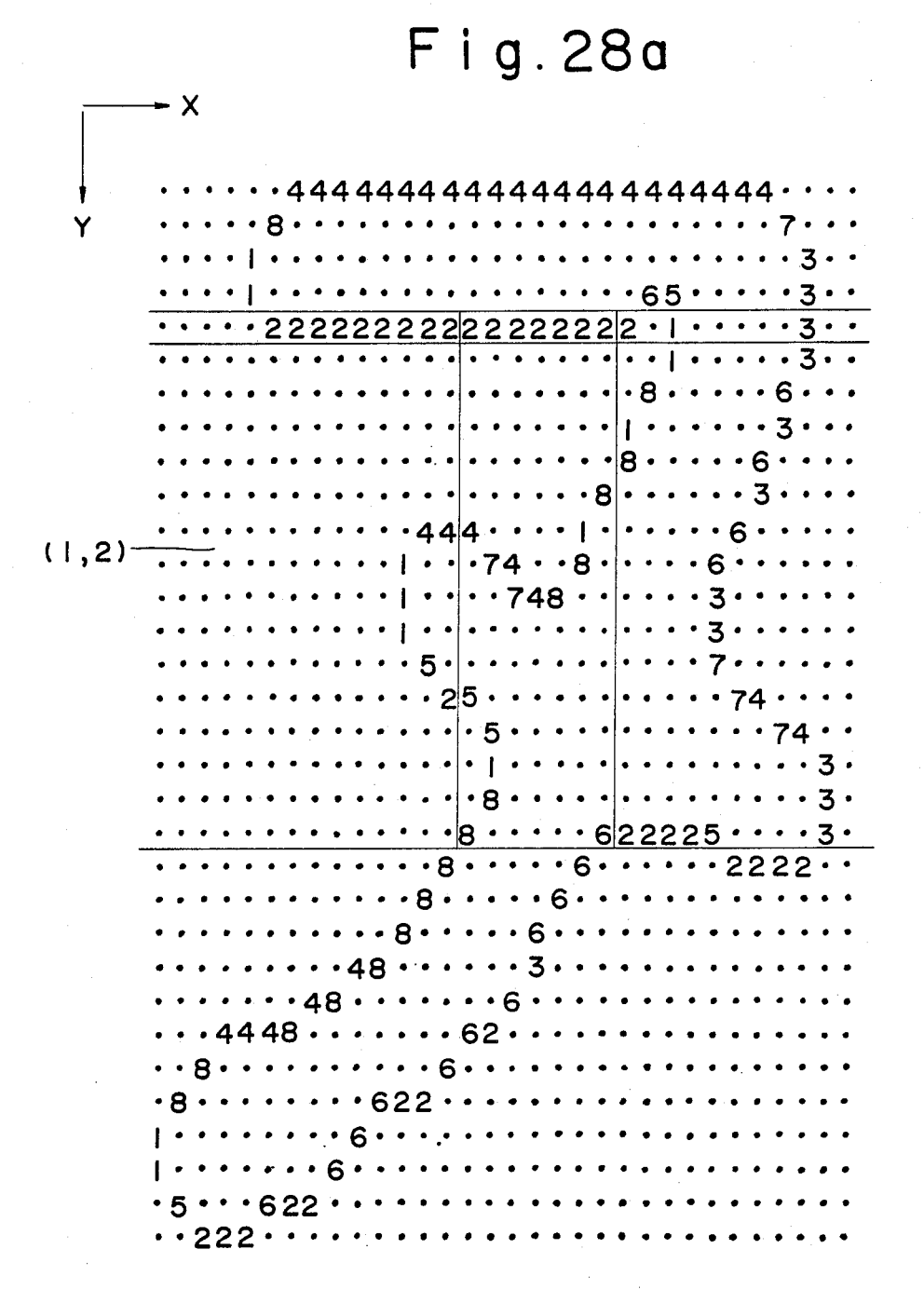
Figure 28B:
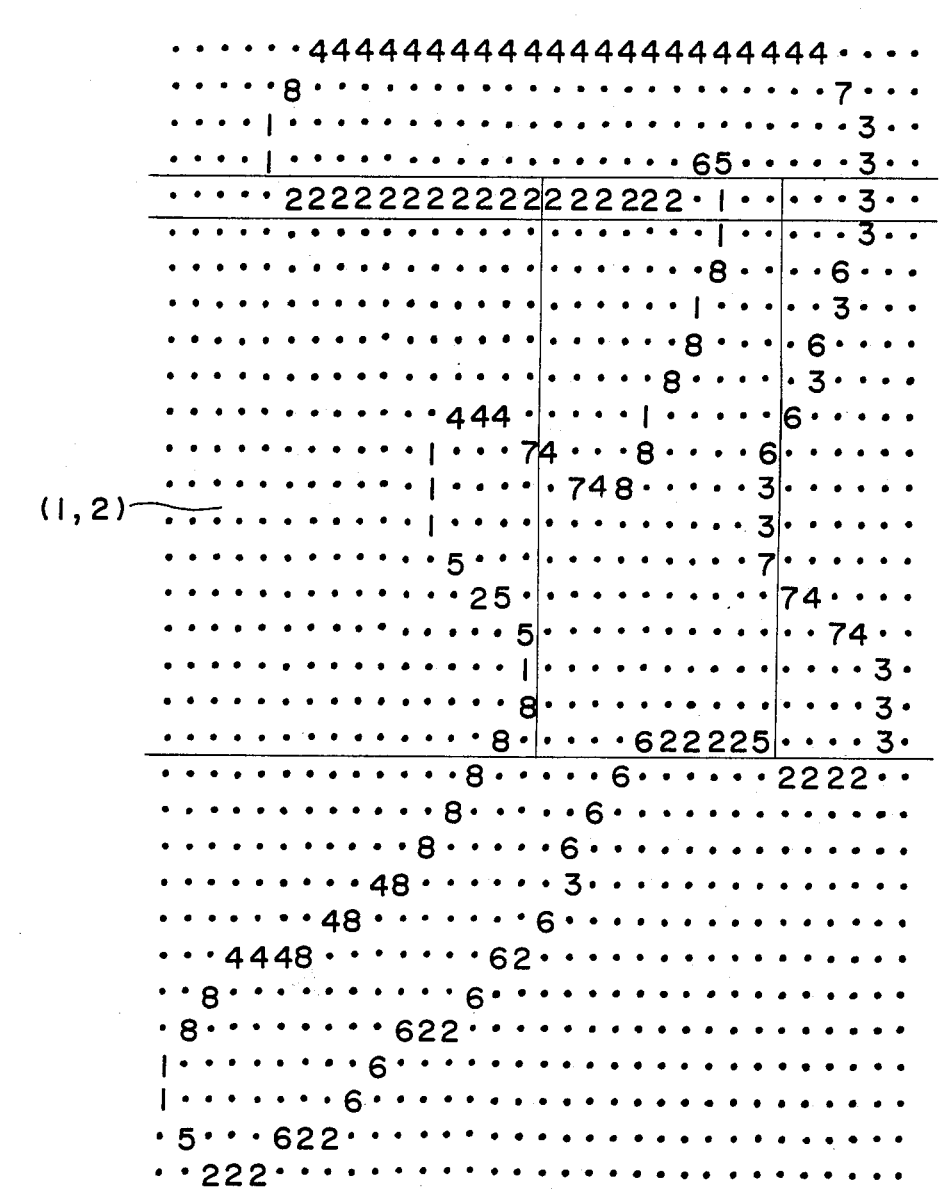

FIG. 28a illustrates the result when character "nu" is subdivided in accordance with the method described with reference to FIGS. 25a and 25b with the assumption of T=1. On the other hand, FIG. 28b illustrates the result when the same character "nu" is subdivided in accordance with the present method just described with reference to FIGS. 27a and 27b with the assumption of T=1. In either case, subdivisions are first implemented in Y direction, and, then, subdivisions in X direction are implemented. It should also be noted that subdivisions in X direction are indicated only in the intermediate sections of those divided in Y direction. A comparison between the two results shown in FIGS. 28a and 28b will lead one to conclude that left lower intermediate sub-region (1,2) of the character image shown in FIG. 28b includes information which reflects the inclined nature of the additional stroke at the center more appropriately. In this manner, even if feature pixels are crowded at a subdividing location, subdivions can be carried out properly and optimally at all times in accordance with the present embodiment.

Figure 29:
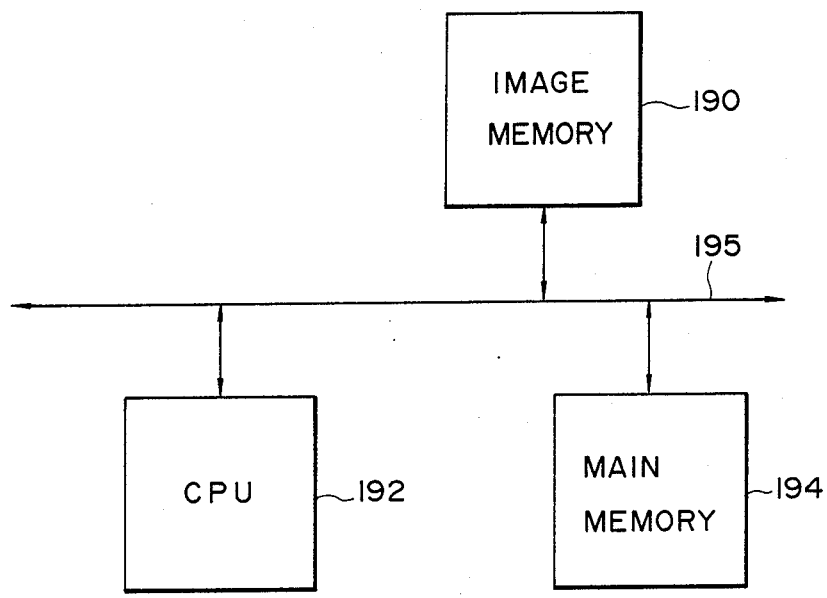
FIG. 29 is a block diagram showing the structure of a character subdividing system capable of implementing the character subdivision processes shown in FIGS. 21a and 21b, 25a and 25b and 27a and 27b.
Figure 30A:
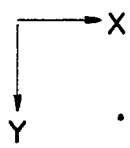

FIG. 29 illustrates in block form a system capable of implementing each of the above-described character subdividing methods. As shown, the system includes an image memory 190 for storing a character image to be processed and also a feature-assigned character image. Also provided in the system is a central processing unit or simply CPU 192 and a main memory 194 which stores a program for each of the above-described methods, tables for the above-described histograms and each of the above-described counters. The CPU 192 is accessible to the image memory 190, a scanning circuit 191 and also to the main memory 194 via a bus 195. In operation, while accessing the image memory 190, the CPU 192 carries out the feature assigning operation as well as counting of the total number of feature pixels and creation of histograms all at the same time. The processed character image having assigned features is stored in the image memory 190, but the data of the total number of feature pixels and the histograms are stored in the main memory 194. Then, during the subsequent processing for determination of subdividing locations, the CPU 192 implements a predetermined routine while referring to the total number of feature pixels and the tables of histograms stored in the main memory 194 and, also, in necessary, to the feature-assigned character image stored in the image memory 190, and, then, the result of thus determined subdividing locations is stored in a particular memory area of the main memory 194. Thus, the system shown in FIG. 29 is most preferably applied as part of a character recognition system.

While the above provides a full and complete disclosure of the preferred embodiments of the present invention, various modifications, alternate constructions and equivalents may be employed without departing from the true spirit and scope of the invention. For example, use has been made of directionality codes as features to be assigned to a character image in the above description; however, any other specific forms of features can also be used. Therefore, the above description and illustration should be not be construed as limiting the scope of the invention, which is defined by the appended claims.

What is claimed is:

1. A character recognizing method, comprising the steps of:

optically reading an input character to be recognized to form a binary character image including at least one character line comprised of black pixels;
  broadening said character line in accordance with a predetermined manner;
  assigning a plurality of first features, different from one another, to each of pixels defining a contour of said binary character image depending on a local pattern of arrangement of black and white pixels along said contour;
  counting said first features assigned to said character image;
  subdiving said character image into a plurality of mesh sub-regions based on the count of said assigned first features;
  extracting a second feature from each of said sub-regions to define a collection of extracted second features; and
  identifying said input character by comparing said collection of extracted second features with each of a plurality of stored collections of second features for known characters and selecting one of said known characters, having a highest degree of similarity.

2. The method of claim 1, wherein said broadening step includes a step of changing a pair of white pixels on both of left-hand and right-hand sides of each of the black pixels of said character line into black pixels.

3. The method of claim 2, wherein said broadening step also includes a step of changing a pair of white pixels on both of top and bottom of each of the black pixels of said character line into black pixels.

4. The method of claim 1, wherein said plurality of first features include a predetermined number of directionality codes each of which is associated with a particular arrangement pattern of black and white pixels.

5. The method of claim 4, wherein said particular arrangement pattern includes a center pixel, a pair of left-hand and right-hand pixels adjacent to said center pixel and a pair of top and bottom pixels adjacent to said center pixel, whereby said center pixel functions as a pixel of interest when said assigning step is carried out.

6. The method of claim 5, wherein said center pixel is a black pixel.

7. The method of claim 5, wherein said center pixel is a white pixel.

8. The method of claim 1, wherein said contour defining pixels are black pixels.

9. The method of claim 1, wherein said contour defining pixels are white pixels.

10. The method of claim 1, wherein said second feature is a histogram of said first features in each of said sub-regions.

11. The method of claim 1, wherein the degree of similarity between said input character and each of said known characters is determined by calculating a distance between said second features of said input character and said second features of each of said known characters.

12. A character recognition method, comprising the steps of:

providing a binary character image of an unknown character to be identified;
  assigning a plurality of directionality codes to pixels defining a contour of said binary character image selectively according to a predetermined rule to define a code-assigned character image;
  counting a total number of code-assigned pixels;

forming a pair of first and second projected histograms of the number of code-assigned pixels, said first projected histogram being formed by projecting the code-assigned pixels onto a first predetermined axis and said second projected histogram being formed by projecting the code-assigned pixels onto a second predetermined axis;

subdiving said code-assigned character image into a plurality of sub-regions based on said total number of code-assigned pixels and said pair of first and second histograms such that each of said sub-regions has a substantially equal number of code-assigned pixels;

determining a histrogram of said codes for each of said sub-regions to form a collection of histograms of said codes for said input character; and identifying said input character by comparing said collection of histograms of said codes with each of a plurality of stored collections of histograms of said codes for known characters and selecting one of said known characters, having a highest degree of similarity.

13. The method of claim 12, wherein said step of providing includes a step of optically scanning said unknown character to form said binary character image.

14. The method of claim 12, wherein said assigning and counting steps are carried out simultaneously.

15. The method of claim 14, wherein said assigning and counting steps are carried out by scanning said binary character image.

16. The method of claim 14, wherein said assigning and counting steps are carried out simultaneously with said step of providing.

17. The method of claim 16, wherein said step of providing is carried out by optically scanning said unknown character.

18. The method of claim 12, wherein each of said directionality codes is associated with a particular arrangement pattern of black and white pixels.

19. The method of claim 18, wherein said particular arrangement pattern includes a center pixel, a pair of left-hand and right-hand pixels adjacent to said center pixel and a pair of top and bottom pixels adjacent to said center pixel, whereby said center pixel functions as a pixel of interest when said assigning step is carried out.

20. The method of claim 19, wherein said center pixel is a black pixel.

21. The method of claim 19, wherein said center pixel is a white pixel.

22. The method of claim 12, wherein said contour defining pixels are black pixels.

23. The method of claim 12, wherein said contour defining pixels are white pixels.

24. The method of claim 12, wherein the degree of similarity between said input character and each of said known characters is determined by calculating a distance between the collection of histograms of said codes of said input character and the collection of histograms of said codes of each of said known characters.

25. The method of claim 12, wherein said first and second predetermined directions extend normal to each other.

26. The method of claim 25, wherein said first direction is a horizontal direction and said second direction is a vertical direction.

27. A character recognition method comprising the steps of:

providing a binary character image of an unknown character to be identified;

assigning a plurality of directionality codes to pixels defining a contour of said binary character image selectively according to a predetermined rule to define a code-assigned character image;

counting a total number of code-assigned pixels;

forming a first projected histogram of the code-assigned pixels, said first projected histogram being formed by projecting the code-assigned pixels onto a first predetermined axis;

subdiving said code-assigned character image into a plurality of first sections in said first predetermined axis based on said total number of code-assigned pixels and said first projected histogram such that each of said first sections has a substantially equal number of code-assigned pixels;

subdiving each of said first sections into a plurality of second sections such that each of said second sections has a substantially equal number of code-assigned pixels, thereby subdividing said code-assigned character image into a plurality of sub-regions in the form of mesh;

determining a histrogram of said codes for each of said sub-regions to form a collection of histograms of said codes for said input character; and identifying said input character by comparing said collection of histograms of said codes with each of a plurality of stored collections of histograms of said codes for known characters and selecting one of said known characters, having a highest degree of similarity.

28. The method of claim 27 further comprising the step of counting a number of code-assigned pixels in each of said first sections prior to the step of subdividing each of said first sections.

29. The method of claim 27, wherein said step of providing includes a step of optically scanning said unknown character to form said binary character image.

30. The method of claim 27, wherein said assigning step and total number counting step are carried out simultaneously.

31. The method of claim 30, wherein said assigning and total number counting steps are carried out by scanning said binary character image.

32. The method of claim 30, wherein said assigning and total number counting steps are carried out simultaneously with said step of providing.

33. The method of claim 32, wherein said step of providing is carried out by optically scanning said unknown character.

34. The method of claim 27, wherein each of said directionality codes is associated with a particular arrangement pattern of black and white pixels.

35. The method of claim 34, wherein said particular arrangement pattern includes a center pixel, a pair of left-hand and right-hand pixels adjacent to said center pixel and a pair of top and bottom pixels adjacent to said center pixel, whereby said center pixel functions as a pixel of interest when said assigning step is carried out.

36. The method of claim 35, wherein said center pixel is a black pixel.

37. The method of claim 35, wherein said center pixel is a white pixel.

38. The method of claim 27, wherein said contour defining pixels are black pixels.

39. The method of claim 27, wherein said contour defining pixels are white pixels.

40. The method of claim 27, wherein the degree of similarity between said input character and each of said known characters is determined by calculating a distance between the collection of histograms of said codes of said input character and the collection of histograms of said codes of each of said known characters.

41. The method of claim 27, wherein said first and second predetermined directions extend normal to each other.

42. The method of claim 41, wherein said first direction is a horizontal direction and said second direction is a vertical direction.

43. A character subdividing method, comprising the steps of:
   providing a binary character image of an input character;
   assigning a plurality of predetermined features to said binary character image selectively in accordance with a predetermined rule, thereby defining a feature-assigned character image;
   counting a total number of assigned features;
   forming a pair of first and second projected histograms of said assigned features, said first projected histogram being formed by projecting said assigned features onto a first predetermined axis and said second projected histogram being formed by projecting said assigned features onto a second predetermined axis; and
   subdividing said feature-assigned character image into a plurality of sub-regions based on said total number of said assigned features and said pair of first and second projected histograms such that said sub-regions have substantially equal numbers of said assigned features.

44. The method of claim 43, wherein said assigning and counting steps are carried out simultaneously.

45. The method of claim 44, wherein said step of providing is carried out simulataneously with said assigning and counting steps.

46. The method of claim 43, wherein said step of providing is carried out by optically scanning said input character.

47. A character subdividing method, comprising the steps of:
   providing a binary character image of an input character;
   assigning a plurality of predetermined features to said binary character image selectively in accordance with a predetermined rule, thereby defining a feature-assigned character image;
   counting a total number of assigned features;
   forming a first projected histogram of said assigned features, said first projected histogram being formed by projecting said assigned features onto a first predetermined axis and said second projected histogram being formed by projecting said assigned features onto a second predetermined axis; and
   subdividing said feature-assigned character image into a plurality of first sections in said first predetermined axis based on said total number and said first projected histogram such that said first sections have substantially equal numbers of said assigned features; and
   subdividing each of said first sections into a plurality of second sections such that each of said second sections has a substantially equal number of said assigned features, thereby subdividing said feature-assigned character image into a plurality of sub-regions in the form of a mesh.

48. The method of claim 47, wherein said assigning and counting steps are carried out simultaneously.

49. The method of claim 47, wherein said step of providing is carried out simultaneously with said assigning and counting steps.

50. The method of claim 47, wherein said step of providing is carried out by optically scanning said input character.

51. The method of claim 47 further comprising the step of counting a number of assigned features in each of said first sections prior to the step of subdividing each of said first sections.

* * * * *